(12) United States Patent
Bar-Gadda

(10) Patent No.: US 10,758,888 B1
(45) Date of Patent: *Sep. 1, 2020

(54) SIMULTANEOUS GENERATION OF ELECTRICITY AND CHEMICALS USING A RENEWABLE PRIMARY ENERGY SOURCE

(71) Applicant: Ronny Bar-Gadda, Palo Alto, CA (US)

(72) Inventor: Ronny Bar-Gadda, Palo Alto, CA (US)

(73) Assignee: Ronny Bar-Gadda, Palo Alto, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/937,756

(22) Filed: Mar. 27, 2018

Related U.S. Application Data

(63) Continuation-in-part of application No. 14/537,792, filed on Nov. 10, 2014.
(Continued)

(51) Int. Cl.
*H01L 31/068* (2012.01)
*B01J 19/12* (2006.01)
(Continued)

(52) U.S. Cl.
CPC ............ *B01J 19/121* (2013.01); *C01B 3/12* (2013.01); *H02S 99/00* (2013.01);
(Continued)

(58) Field of Classification Search
CPC ............ B01J 19/121; B01J 2219/12; B01J 2219/0884; H02S 99/00; C01B 3/12;
(Continued)

(56) References Cited

U.S. PATENT DOCUMENTS

| 3,254,244 A | 5/1966 | Gottlieb et al. |
| 3,302,095 A | 1/1967 | Bell et al. |

(Continued)

FOREIGN PATENT DOCUMENTS

| CN | 1386317 A | 12/2002 |
| CN | 102723895 A | 10/2012 |

(Continued)

OTHER PUBLICATIONS

Second Office Action for Chinese Patent Application No. 201580054318.0 dated Dec. 12, 2018, (21 pgs).
Response to second office action filed Feb. 25, 2019, for Chinese Patent Application No. 201580054318.0, (23 pgs).
International Search Report dated Jan. 7, 2013, pp. 45-50, in International Patent Application No. PCT/EP2012/003241, (6 pgs).
Cyril Stephanos, "Thermoelectronic Power Generation from Solar Radiation and Heat", Dec. 17, 2012, Augsburg. Retrieved from the Internet: <URL:http://opus.bibliothek.uni-augsburg.de/opus4/files/2253/DissertationStephanos.pdf>, (16 pgs).
(Continued)

*Primary Examiner* — Lisa S Park
(74) *Attorney, Agent, or Firm* — North Weber & Baugh LLP; Michael North

(57) ABSTRACT

Presented are systems and methods to simultaneously produce and store energy in the form of chemical products such as hydrogen and other chemical products, thereby, reducing or eliminating the need to store energy in lithium-ion batteries. In various embodiments this is accomplished by converting energy from a renewable energy source to generate and accelerate an electron beam so as to generate electromagnetic radiation at frequencies equal to absorption frequencies of chemical reactants in order to produce the desired chemical products.

20 Claims, 16 Drawing Sheets

Related U.S. Application Data

(60) Provisional application No. 62/061,578, filed on Oct. 8, 2014.

(51) Int. Cl.
*H02S 99/00* (2014.01)
*C01B 3/12* (2006.01)

(52) U.S. Cl.
CPC .... *B01J 2219/0884* (2013.01); *B01J 2219/12* (2013.01); *C01B 2203/02* (2013.01); *C01B 2203/066* (2013.01); *C01B 2203/068* (2013.01); *C01B 2203/84* (2013.01)

(58) Field of Classification Search
CPC ............ C01B 2203/02; C01B 2203/84; C01B 2203/068; C01B 2203/066; Y02E 10/566; H01M 2250/402; H01G 9/20; H01L 31/00
See application file for complete search history.

(56) References Cited

U.S. PATENT DOCUMENTS

| | | | |
|---|---|---|---|
| 4,247,379 A | 1/1981 | Leach | |
| 8,816,192 B1 | 8/2014 | Walitzki | |
| 9,985,299 B1 * | 5/2018 | Bar-Gadda | B01J 19/088 |
| 2002/0157701 A1 | 10/2002 | Akamatsu | |
| 2007/0045125 A1 | 3/2007 | Hartvigsen et al. | |
| 2007/0054170 A1 | 3/2007 | Isenberg | |
| 2007/0163889 A1 | 7/2007 | Kato et al. | |
| 2008/0121525 A1 | 5/2008 | Doland | |
| 2009/0108252 A1 | 4/2009 | Banerjee et al. | |
| 2009/0189445 A1 | 7/2009 | Strizki | |

FOREIGN PATENT DOCUMENTS

| | | |
|---|---|---|
| CN | 202926407 U | 5/2013 |
| JP | 2005116736 A | 4/2005 |
| WO | 2007077366 A2 | 7/2007 |
| WO | 2008016728 A2 | 2/2008 |
| WO | 2009012154 A2 | 1/2009 |
| WO | 2009048685 A1 | 4/2009 |
| WO | 2010013244 A2 | 2/2010 |
| WO | 2010013244 A3 | 2/2010 |
| WO | 2014019594 A1 | 2/2014 |

OTHER PUBLICATIONS

Notice of Granting Patent Right for Invention, for Chinese Patent Application No. 201580054318.0, The China National Intellectual Property Administration, dated Mar. 13, 2019, (4 pgs).
Response to office action filed Oct. 16, 2018 in Chinese Patent Application No. 201580054318.0 (38 pgs).
First Office Action for Chinese Patent Application No. 201580054318.0 dated Jun. 26, 2018, (26 pgs).
Dominick Lovicott: "Electron EmissionThermal Energy Conversion", Jul. 1, 2010 (Jul. 1, 2010), XP055061237, Missouri, Columbia, US. [Retrieved on Apr. 26, 2013] Retrieved from the Internet: <URL:https://mospace.umsystem.edu/xmlui/bitstream/handle/10355/9264/research.pdf?sequence=3> p. 110-p. 127 (18 pgs).
Nation J A et al: "Advances in Cold Cathode Physics and Technology", Proceedings of the IEEE, IEEE. New York, US, vol. 87, No. 5, May 1, 1999 (May 1, 1999). (25 pgs).
G. L. Kulcinski, "Thermionic Energy Conversion", Feb. 16, 2010 (Feb. 16, 2010), XP055061430, [Retrieved on Apr. 29, 2013] Retrieved from the Internet: <URL:http://fti.neep.wisc.edu/neep602/SPRING00/lecture9.pdf> p. 15. (21 pgs).
S. Meir et al., "Highly-Efficient Thermoelectronic Conversion of Solar Energy and Heat into Electric Power", Jan. 15, 2013 (Jan. 15, 2013), pp. 1-10, XP055061176, [retrieved on Apr. 25, 2013] Retrieved from the Internet: <URL:http://arxiv.org/pdf/1301.3505.pdf> The whole document. (10 pgs).
International Search Report dated Dec. 18, 2015, in related Application No. PCT/US15/053819, filed Oct. 2, 2015 (2pgs).
Written Opinion dated Dec. 18, 2015, in related Application No. PCT/US15/053819, filed Oct. 2, 2015 (6pgs).
Sterling D. Allan: "World's largest solar installation to use Stirling engine technology"; Aug. 11, 2005 (Aug. 11, 2005), XP002557486. Available from the Internet: <URL:http://pesn.com/2005/08/11/9600147_Edison_Stirling_largest_solar/> [retrieved on Nov. 26, 2009] (7pgs).
Supplementary European Search Report dated Jun. 28, 2018, in related Application No. EP15848281 (5pgs).
International Search Report dated Dec. 18, 2009, in related Application No. PCT/IL2009/000743 (4pgs).

* cited by examiner

SIMULTANEOUS GENERATION OF ELECTRICITY AND CHEMICALS USING A RENEWABLE PRIMARY ENERGY SOURCE

CROSS REFERENCE TO RELATED PATENT APPLICATIONS

The present application is a continuation-in-part application of U.S. patent application Ser. No. 14/537,792, entitled "Simultaneous Generation of Electricity and Chemicals using a Renewable Primary Energy Source" by Ronny Bar-Gadda, filed on Nov. 10, 2014, which claims the benefit of U.S. Provisional Patent Application No. 62/061,578, titled "The Simultaneous Generation of Electricity and Chemicals using a Renewable Primary Energy Source," filed Oct. 8, 2014, which applications are hereby incorporated herein by reference in their entirety.

BACKGROUND

A. Technical Field

The present invention relates to the generation and storing of electricity and chemical products and, more particularly, to systems, devices, and methods of concurrently generating power and electromagnetic radiation using renewable sources while producing chemical reactants.

B. Background of the Invention

Existing methods of generating electrical power through combustion of conventional fossil fuel energy sources are typically based on the utilization of a working fluid such as a gas or boiler-generated stream in a thermodynamic cycle in order to generate a motive force for rotating the shaft of a turbine, thereby, transforming chemical energy into an electromotive force that generates electrical energy. These methods are inherently limited by the maximum achievable Carnot cycle efficiency. In addition, the change of phase of material, such as the transformation of the water to steam requires large quantities of energy, most of which is lost in the form of heat due to condensation after exiting the turbine.

Alternative technologies that generate electrical power in the form of current and voltage from non-carbon-based sources suffer similarly from respective theoretical maximum efficiencies, for example, 59.3% for wind technology.

In contrast, solar cell technology using the photovoltaic effect undergoes an isothermal process that is not subject to power cycle analysis and the limitations of the Carnot cycle efficiency. Energy from the sun in the form of photons carrying energy or electromagnetic radiation can be harnessed directly to induce an electromotive force on free electrons to generate electrical power. Unfortunately, solar cells have inherent losses, such as FR losses, and the energy produced in the cell still needs to be stored before it can be transported and used. Until now, this made solar energy unattractive for applications such as the industrial-scale production of chemicals in capital-intensive facilities. What is needed are environmentally friendly systems and processes that efficiently produce chemicals while overcoming the above-described limitations.

SUMMARY OF THE INVENTION

In embodiments, a power generating apparatus includes: an emitter to convert a first current that has been derived from a solar cell into a coherent electron beam, the emitter having a first single potential; a collector having a second potential to accelerate electrons in the coherent electron beam, the collector provides a second current that is capable of driving a load, the collector comprises a surface that has a material with favorable secondary electron emission characteristics to generate secondary electron emission; and an electromagnetic radiation device to generate electromagnetic radiation at a frequency substantially equal to an absorption frequency of a predetermined chemical reactant to generate hydrogen from water vapor.

In embodiments, a power generating apparatus includes a power generation system to generate energy from a renewable energy source. The power generation system includes: an apparatus that generates a first current from a solar cell; an emitter to convert the first current into a coherent electron beam, the emitter having a first single potential; a collector having a second potential to accelerate electrons in the coherent electron beam, the collector providing a second current, the collector comprises a surface that has a material with favorable secondary electron emission characteristics to generate secondary electron emission; a converter that converts the second current to a power source capable of driving a load; and an electromagnetic radiation device that generates electromagnetic radiation at a frequency substantially equal to an absorption frequency of a predetermined chemical reactant to generate hydrogen from water vapor.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIGURE ("FIG.") 1 is a general illustration of a system to generate energy from a renewable energy source according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
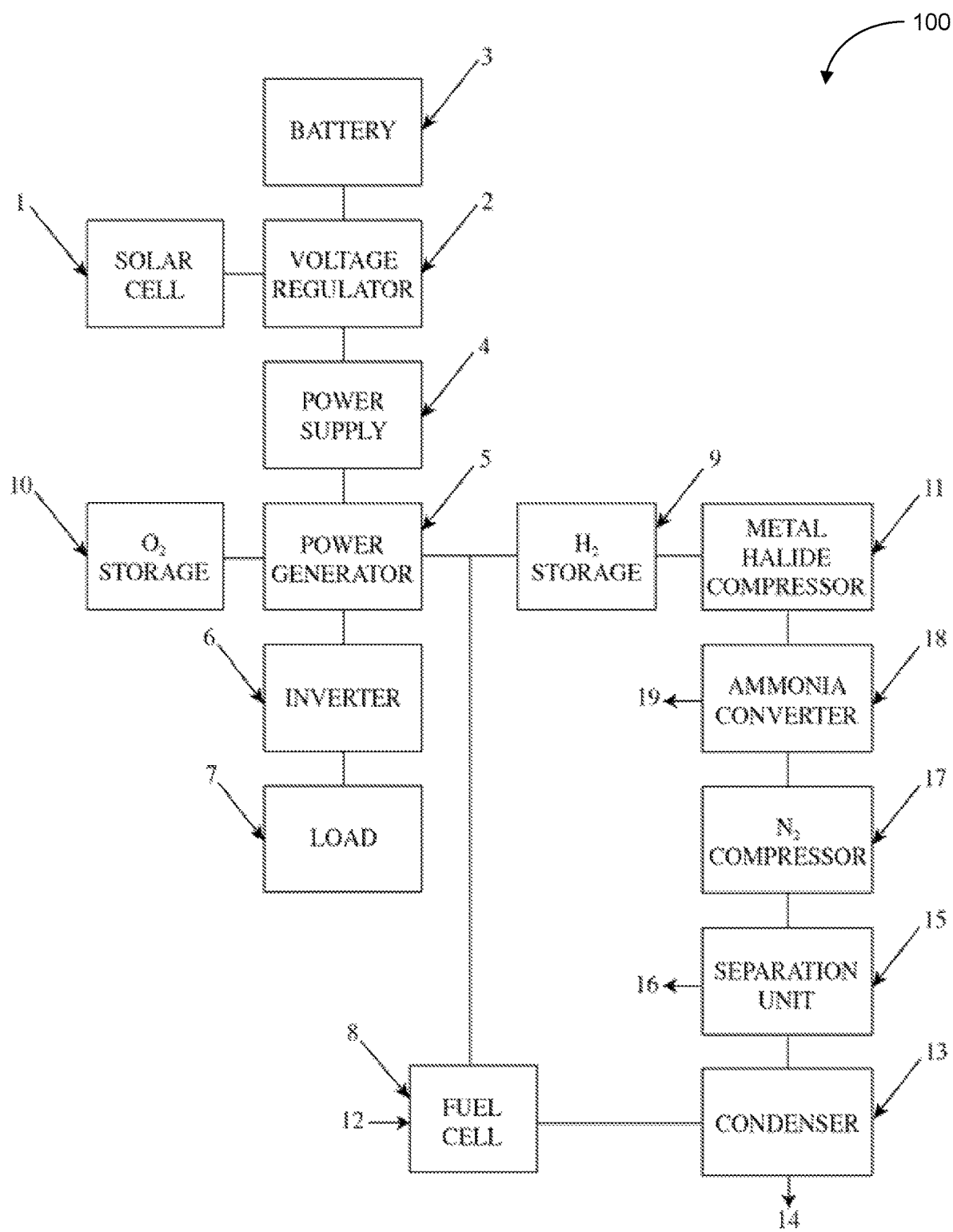

FIG. 1 is a general illustration of a system to generate energy from a renewable energy source according to various embodiments of the invention. System 100 comprises solar cell 1, voltage regulator 2, battery 3, power supply 4, power generator 5, inverter 6, load 7, fuel cell 8, hydrogen storage 9, oxygen storage 10, metal halide compressor 11, condenser 13, separation unit 15, nitrogen compressor 17, and ammonia converter 18. Solar cell 1 typically comprises a plurality of a solar panels that convert photons from sunlight into voltage. In one embodiment, solar cell 1 is implemented as a high voltage solar panel that outputs a sufficiently high voltage to replace power supply 4.

Solar cell 1 is coupled to voltage regulator 2 that in operation regulates the output voltage of solar cell 1 to smooth out voltage variations due to varying insolation caused by natural variations in the sun's position relative to solar cell 1 and meteorological conditions, such as clouds causing a reduction in the intensity of sunlight incident on the surface of solar cell 1. Battery 3 provides energy, especially, it instances where the sun's insolation is reduced to a level that causes the power output of power generator 5 to fall below a minimum value. Battery 3 may advantageously be operated at nighttime to enable continuous power delivery by system 100 to load 7, which is an electric motor or any other electric device. Likewise, metal hydride compressor 11 may be used in conjunction with fuel cell 8 to generate electricity during hours when the solar insolation falls below a critical level of performance in which the solar panel delivers power at a rate that cannot meet demand. Power supply 4 may provide direct or alternating current to power generator 5. In one embodiment, power generator 5 is designed to generate high frequency electromagnetic radiation that may be used, for example, to generate hydrogen from water vapor.

The electromagnetic radiation is generated by resonant or non-resonant structures designed to interact with an electron beam to generate one or more high frequencies. Ideally, the frequencies fall in a range of absorption frequencies useful for creating desired chemical compounds. The operation of sections of system 100 under vacuum conditions allows for the generation of the water vapor taking advantage of the depressed boiling point at sub-atmospheric pressures. In one embodiment, hydrogen is generated from water vapor using electromagnetic radiation by generating frequencies equal to the optimum frequency for absorption of energy in water molecules.

Water vapor may be produced by any method known in the art, including evaporation by solar heating or electrical heating, e.g., using electrical energy provided by solar cell 1. Water from any source, including waste water and salt water, may be dissociated into its elements, hydrogen and oxygen, and burned to form purified water. The resulting combustion heat may be used to produce electricity via conventional turbine technology. The so generated energy can then power, for example, water pumps that distribute the generated water.

In example in FIG. 1, oxygen generated in power generator 5 is delivered to oxygen storage unit 10, while generated hydrogen is delivered to storage unit 9. Fuel cell 8 generates electricity for night time operation of system 100. Fuel cell 8 derives its hydrogen fuel from hydrogen storage unit 9 and air or oxygen from oxygen storage 10. A compressor (not shown) may be advantageous placed between hydrogen storage unit 9 and fuel cell 8 to increase the pressure of the hydrogen entering fuel cell 8. Since solar power is direct current in nature, inverter 6 may be used to generate an alternating current depending on the requirements of power generator 5, whose components and function are described further below with respect to FIG. 2, but may not be necessary in DC applications of power generator 5 and in single or three-phase power generation application, as described further below.

In one embodiment, system 100 in FIG. 1 is designed to produce ammonia in addition to producing hydrogen and oxygen. If carbon dioxide is used as a reactant instead of nitrogen, other chemicals such as methane or methanol may be produced. Since ammonia is thermodynamically favored at high pressure and low temperatures, as can be derived from its stoichiometry, a compressor, e.g., metal hydride compressor 11, can be used to increase the pressure to meet desired reaction conditions. Similarly, nitrogen compressor 17 is utilized in order to raise the nitrogen pressure. In one embodiment, hydrogen from metal hydride compressor 11 and nitrogen from 17 are combined in ammonia converter 18 in order to produce ammonia products 19. Unlike existing methods that generate pure nitrogen from the air using conventional separation methods such as cryogenic or membrane separation, the concomitant production of noble gases and pure water along with nitrogen using system 100 optimizes the economics and efficiency of the overall production of ammonia.

Condenser 13 located at the exit of fuel cell 8 recovers the water generated as pure condensed water 14 byproduct of the electricity generation process. Condensed water 14 may be gathered and sold or serve other process functions, such as cooling. The remaining residual gases flow to separation unit 15 where noble gases are removed, shown as exit stream 16 in FIG. 1. Their constituents can be removed separately through many different methods. For example, separation unit 15 may be an adsorption column, whereby separation of the various gaseous components are eluded according to their adsorption coefficient on the surface of the material used for the separation. These materials are commonly found in adsorption columns in gas chromatographic processes. The remaining constituent, nitrogen, enters nitrogen compressor 17 for use in the ammonia synthesis process.

Since air contains both nitrogen and noble gases (e.g., helium, argon, xenon, krypton) as well as oxygen, these materials as well as the product of the fuel cell process, i.e., water, can be recovered as byproducts. In one embodiment, the oxidizer for fuel cell 8 may operate with air 12 instead of pure oxygen from oxygen storage 10, and noble gases are recovered. Nitrogen may also be recovered from exit stream 16 since its separation properties are sufficiently distinctive from that of oxygen. The two key products; namely, hydrogen and nitrogen, may be combined in the correct ratio to produce ammonia. Other commercial chemicals such as methanol, ethanol, hydrocarbons, ethers, longer chain alcohols, aldehydes, ketones, phenols, heterocyclic compounds, etc. may be produced from $CO_2$, which may be obtained from a variety of sources.

Figure 2:
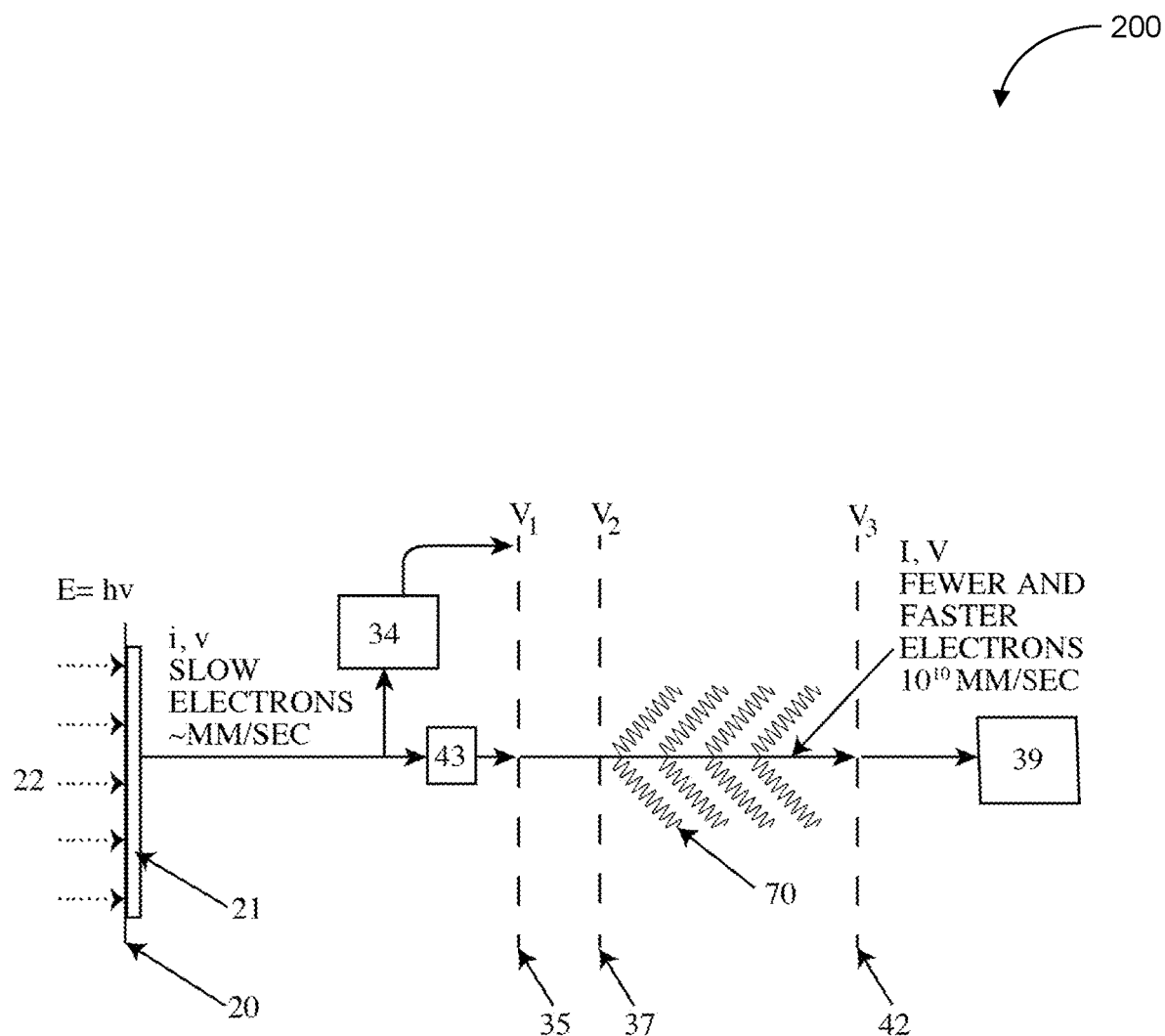
FIG. 2 is an exemplary schematic of a power generator to generate energy from a renewable energy source according to various embodiments of the invention.

FIG. 2 is an exemplary schematic of a power generator to generate energy from a renewable energy source according to various embodiments of the invention. Power generator 200 comprises solar cell 20 comprising p-n junction 21, transformer 34, heater 43, emitter 35, grid 37, collector 42, and power conditioner 39. In operation, solar cell 20 receives electromagnetic radiation in the form of sun light 22 that is captured, temporarily stored in p-n junction 21, and output to both transformer 34 and heater 43. Heater 43 performs thermionic generation of electrons from emitter 35, while transformer 34 raises the voltage on emitter 35 to higher levels. Electrons emitted from emitter 35 form a coherent train of electrons or an electron beam that is directed through grid 37.

In one embodiment, the electron beam is employed to generate pulsed or alternating current. The electrons are subsequently deposited on one or more collector electrodes 42 in order to capture the energy in the electron beam. In one embodiment, multiple collector electrodes 42 within varying bias voltages may be positioned in such a manner as to capture electrons having different levels of the kinetic energy. The collected electrons generate a current that can be filtered and otherwise processed to drive various types of loads (not shown).

The method of accelerating electrons in example in FIG. 2 may be used to generate coherent electromagnetic radiation 70 using various structures, such as resonating cavities, magnets or coils, dielectric liners, etc. In embodiments, coherent electromagnetic radiation 70 is tuned to a specific frequency or band of frequencies that is used to perform specific tasks, as will be discussed with respect to FIG. 4 through FIG. 7 below.

Figure 3:
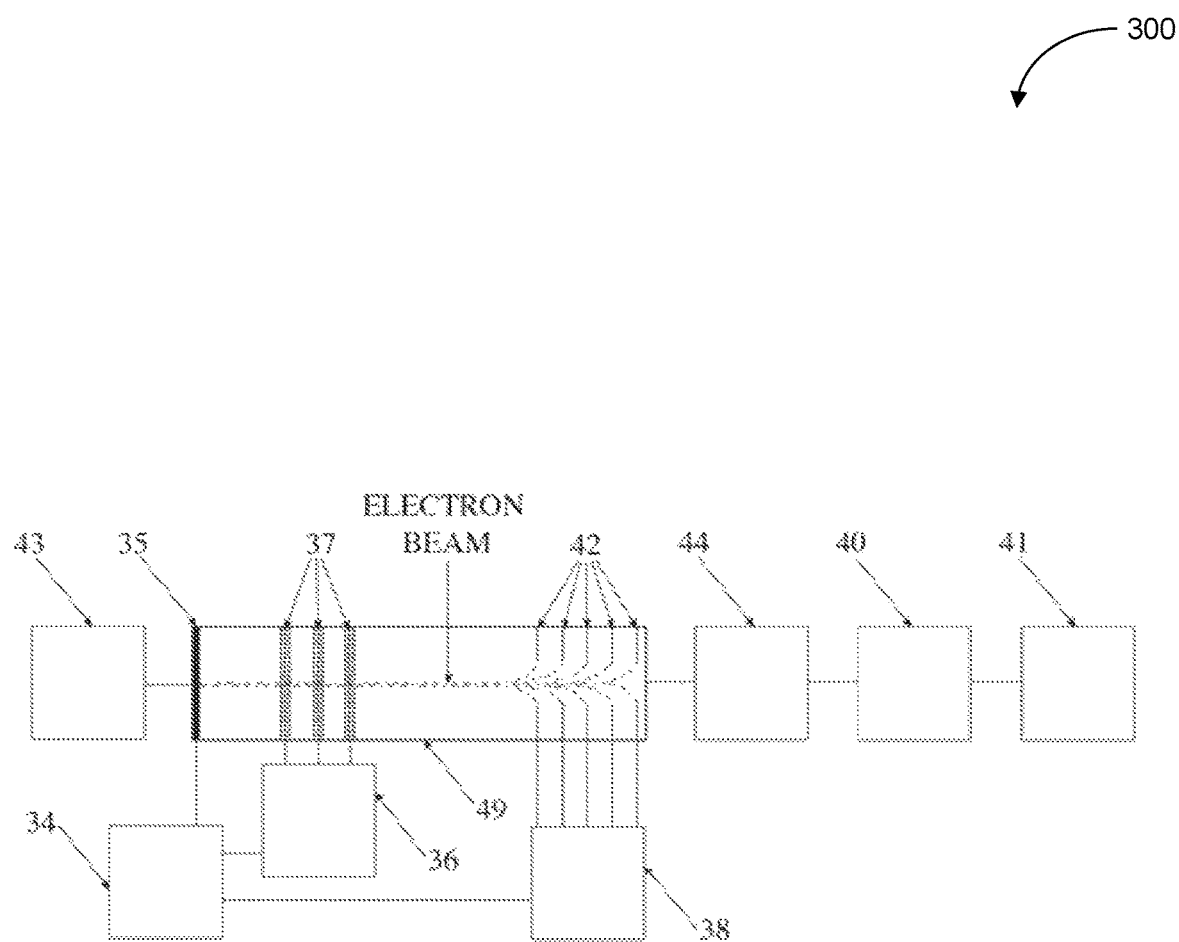
FIG. 3 is an exemplary a power generator capable of generating phased electrical power according to various embodiments of the invention.

FIG. 3 is an exemplary a power generator capable of generating phased electrical power according to various embodiments of the invention. Power generator 300 comprises power supply 34, emitter 35, grid power supply 36, grid 37, collector power supply 38, collector electrodes 42, heater power supply 43, inverter 39, transformer 40, and load 41. Although power generator 300 may produce electromagnetic radiation, it is not optimized to produce a coherent electron beam at a specific or band of frequencies. Grid 37 is a fine mesh to allow the electron beam to pass through or be stopped according to the desired outcome. The mesh is used to allow electrical continuity and a path for the applied charge.

In operation, cathode power supply 34 provides power for emitter 35. Grid power supply 36 controls the space charge in drift tube 49 by superimposing a forcing function, e.g., a pulsed or sinusoidal waveform, on the electron beam in order to simulate an alternating current. Using three grids 37 permits three-phase electrical power generation in that each grid has a sinusoidal forcing function that is 120 degrees out of phase with the other two sinusoids. The net result of this operation is a three-phase alternating beam current. The advantage of this embodiment is that inverter 39 is not needed, such that (e.g., after a filtering step) the current can go directly to transformer 40 and to load 41.

In one mode of operation, the electron beam is pulsed. This may easily be accomplished by turning on and off the current and voltage applied to grid 37 by grid power supply 36 in order for the electron beam to mimic the properties of grid 37. Optional heater power supply 43 is coupled to emitter 35 (e.g., field emission emitter) to support the creation of thermionic electrons. As shown in example in FIG. 3, collector power supply 38 is referenced to cathode power supply 34. The potential of collector electrodes 42 are matched to the potential of the electrons in the electron beam in order to recover the energy of the beam.

In instances where grid 37 is not used as a means to convert a direct current electron beam into alternating current, inverter 39 may be used to provide that functionality. In addition, inverter 39 may comprise power conditioning circuitry to process the power output from collector electrodes 42. For example, inverter 39 may be designed to eliminate noise and spurious signals, such as unwanted spikes. Transformer 40 typically converts a low current at a high voltage present at the output of inverter 39 into a relatively lower voltage but higher current, prior to delivering power to load 41.

While FIG. 3 depicts an embodiment comprising three grids 37 designed to generate three-phase power, it is understood that other phases, e.g., single-phase power may equally be generated by power generator 300 by utilizing a single grid 37. One of ordinary skill in the art will appreciate that also different waveforms may be generated using various methods known in the art, including amplitude modulation, pulsed code modulation, pulsed duration modulation, pulsed position modulation, pulsed amplitude modulation, and frequency modulation.

Figure 4:
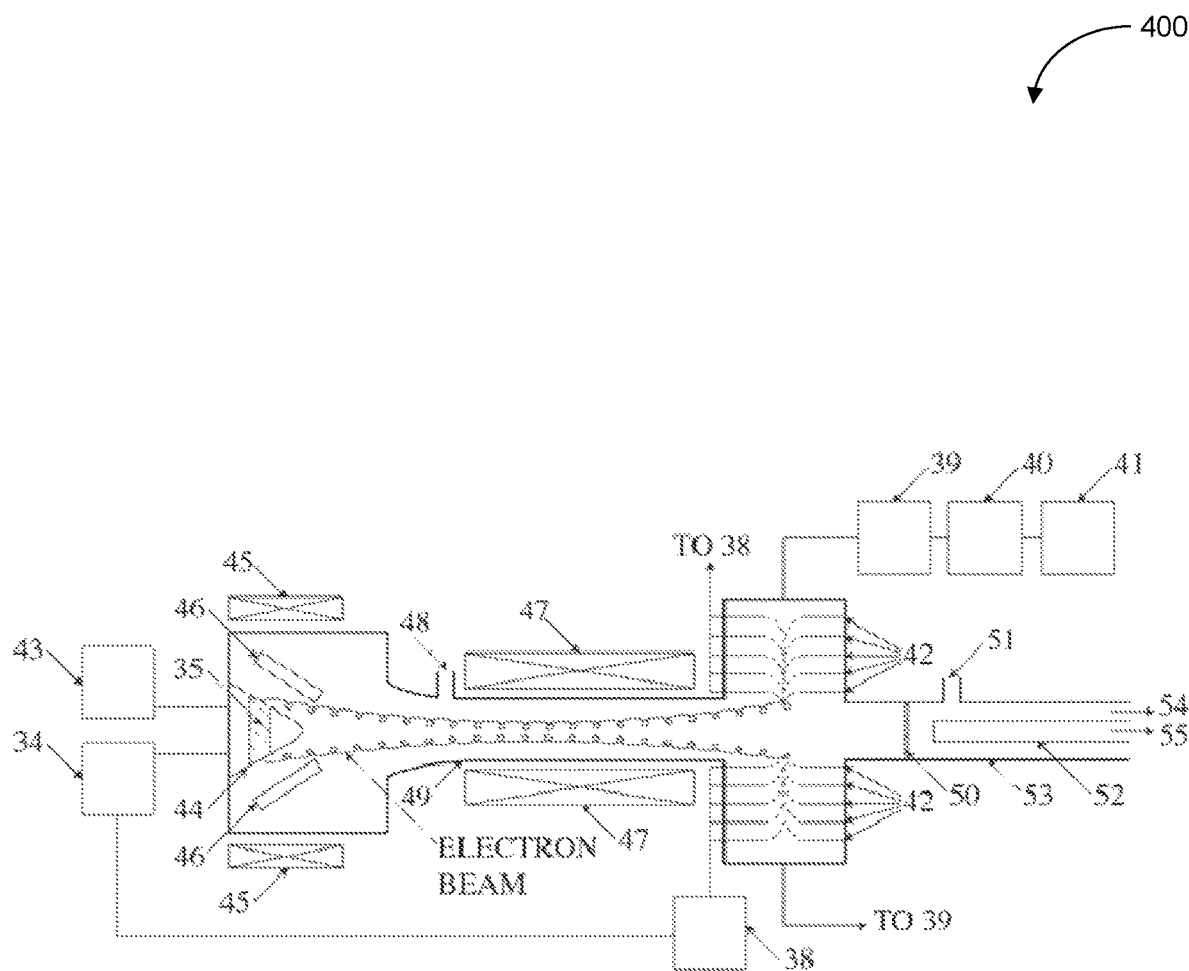
FIG. 4 illustrates a power generator capable of producing electromagnetic radiation at a specific microwave frequency according to various embodiments of the invention.

FIG. 4 illustrates a power generator capable of producing electromagnetic radiation at a specific microwave frequency, according to various embodiments of the invention. Power generator 400 comprises emitter power supply 34, emitter or cathode 35, collector power supply 38, inverter 39, transformer 40, and load 41, collector electrodes 42, heater power supply 43, magnetron injection gun 44, magnets 45, anode 46, magnetic assembly 47, port 48, 51, drift tube 49, window 50, inner tube 52, outer tube 53, and exit ports 54 and 55, respectively. For clarity, components similar to those shown in FIG. 3 are labeled in the same manner.

As shown in FIG. 4, electromagnetic reactor section of power generator 400 consists of two coaxial concentric tubes, inner tube 52 and outer tube 53. Inner tube 52 typically comprises a porous wall or membrane that allows for selective diffusion of products generated in inner tube 52 to exit from outer tube 53. Outer tube 53 forms a non-porous walls of the reactor. In one embodiment, a difference in pressure between inner tube 52 and outer tube 53 causes selective diffusion of one component so that outer tube 53 is enriched in one component over another component. Conversely, reactants may enter outer tube 53 and exit after passing through the membrane of inner tube 52.

In order to maintain high voltage on emitter 35, power supply 34 may be employed. Power supply 34 derives its power from a renewable energy resource, such as the solar panel assembly mentioned previously. In one embodiment, a to-be-amplified signal from an electromagnetic source (e.g., IMPATT diode, RF, Microwave, sunlight, etc.) is provided through port 48. It is noted that port 48 may be used to extract energy as well as add energy to an existing electron beam.

In one embodiment, magnetron injection gun 44 is energized by supply 43 to generate a "hollow" electron beam via emitter 35. Anode 46 is positioned in a manner such as to cause the electron beam to initiate a rotational motion, while magnets 45 are strategically placed to aid in compressing the beam and directing it into drift tube 49. As the beam enters the drift tube 49, magnet 47 promotes the cyclonic and rotational movement of electrons in the beam and cause the electron beam to generate radiation at high frequency. The energy of the electron beam is captured by collector electrodes 42, which are powered by supply 38 and referenced to cathode power supply 34. The current then flows through power conditioner and inverter 39. As with embodiments related to FIG. 3, the beam may be modulated such as to establish an alternating current, thus, eliminating the need for inversion. The power conditioner may also filter out extraneous noise and signals in order to ensure a clean power signal entering transformer 40 and/or load 41.

It is known that some reactant molecules, such as water, have pronounced absorption frequencies that lie in the infrared, visible, and ultraviolet regions of the electromagnetic spectrum. Therefore, in one embodiment, power generator 400 is designed to generate specific frequencies, allow the electromagnetic portion of the beam to travel through window 50, and facilitate energy coupling to chemicals in the reactor section of power generator 400 in order to perform desired chemical reactions. In one embodiment, the frequencies generated in drift tube 49 correspond to absorption frequencies of reactant molecules entering reactor 53 through port 51.

Once the electromagnetic radiation imposed on the molecules is sufficiently strong to break the valence bonds between atoms, the reactant molecules dissociate into chemical products. For example, if the generated frequencies correspond to frequencies of maximum absorption for water vapor in a region of interest, then dissociation takes place once sufficient vibrational energy is generated to break the hydroxyl bonds to create hydrogen and oxygen. Gaseous products are separated through the membrane of inner tube 52, which may be designed to be selective to only one of the gases. The separated gases leave the reactor through exit ports 54 and 55, respectively.

In the region where water vapor dissociation is optimum (e.g. ultraviolet, microwave, and infrared regions of the electromagnetic spectrum), the combination of inner and outer tubes 52, 53 may be considered a coaxial waveguide for electromagnetic waves generated in drift tube 49. The waveguide structure enables efficient decomposition of water vapor by dissociating water molecules entering outer tube 53. Since hydrogen possesses a higher molecular velocity than oxygen, it diffuses through the membrane of inner tube 52 to accumulate at high concentration in inner tube 52 from which it flows to exit port 55. The membrane may have a non-permeable coating (e.g., palladium, copper-palladium, silver-palladium, etc.) and be porous or selective to hydrogen so that relatively little or no oxygen molecules tend to diffuse from outer tube 53 to exit port 55. Conversely, water molecules may enter through port 51 and exit through port 55 instead of port 54 via an opening in the membrane of inner tube 52. One skilled in the art will appreciate that other classes of zeolites and activated carbons may be used.

Figure 5:
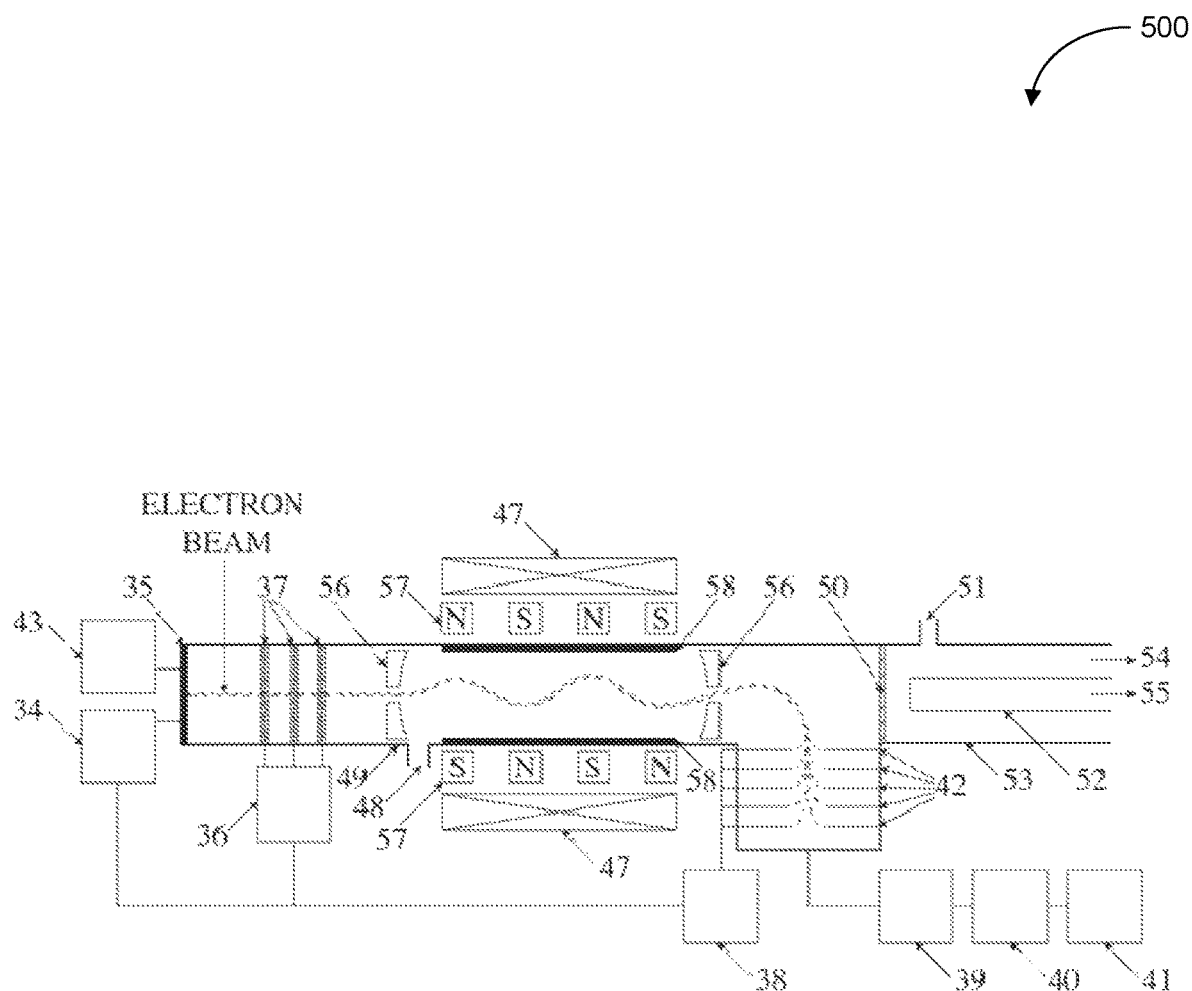
FIG. 5 illustrates a power generator capable of producing high frequency electromagnetic radiation via transverse motion of an electron beam, according to various embodiments of the invention.

FIG. 5 illustrates a power generator capable of producing high frequency electromagnetic radiation via transverse motion of an electron beam, according to various embodiments of the invention. Power generator 500 comprises emitter power supply 34, emitter or cathode 35, collector power supply 38, inverter 39, transformer 40, and load 41, collector electrodes 42, heater power supply 43, magnet 47, port 48, 51, drift tube 49, window 50, inner tube 52, outer tube 53, exit port 54-55, mirror 56, alternating magnetic assembly 57, and dielectric liner 58.

In example in FIG. 5, alternating magnetic assembly 57 is disposed between drift tube 49 and magnet 47. In operation, alternating magnetic assembly 57 maximizes a transvers motion of electrons in the electron beam. Mirror 56 aids in the generation of a coherent electromagnetic radiation that is used to produce a resonance effect within drift tube 49. Optional grid 37 may be used to operate power generator 500 in a way produce alternating current mentioned previously.

In one embodiment, alternating magnetic assembly 57 is replaced with a traveling wave guide structure in which a traveling wave is generated along a coil (not shown). The traveling wave enters drift tube 49 through port 48 and carries a high frequency wave. Under proper conditions, energy is exchanged between the electron beam and the traveling wave in order to amplify the wave or increase the energy of the electron beam. Magnetic assembly 47 may create a longitudinal magnetic field that compresses the electron. Magnetic assembly 47 may also create a cyclonic motion within the electron beam. The rotational component of the electrons generates a radiation field that interacts with the traveling wave of the coil.

In one embodiment, alternating magnetic assembly 57 and magnet 47 are replaced with a resonator structure to generate high frequency waves along which power can be extracted from an electron beam comprising bunched or bunching electrons. This embodiment may be used to amplify the resonant frequency in drift tube 49 to generate frequencies that otherwise are difficult to generate. For example, port 48 may receive electromagnetic waves having at certain frequencies. As the wave enters drift tube 49, under proper conditions, amplification of the electromagnetic waves occurs when energy is extracted from the electron beam. Part or all of the remaining energy of the electron beam is captured through collector electrodes 42 and processed as described elsewhere with respect to other embodiments. Port 48 may also be used to generate alternating current by injecting a wave having a frequency of, for example, multiples of 60 Hz. Power generator 500 may be designed to generate frequencies in any of the sub-millimeter, millimeter, infrared, visible, and ultraviolet regions of the electromagnetic spectrum to facilitate absorption by reactant molecules with corresponding absorption frequencies.

For example, at 22.235 GHz, a water molecule will absorb energy at the $5_{-1}$-$6_{-5}$ transition. In addition, water absorbs greater amounts of energy in the sub millimeter region. Absorption peaks at 183.31 GHz (k=1.635 mm), 321.225 GHz (k=0.933 mm), 325.152 GHz (k=0.922 mm), 380.197 GHz ($\lambda$=0.7885 mm) are just a few of the absorption frequencies for water vapor. There are numerous such frequencies in the sub-millimeter and far infrared region, including 448.001 GHz ($\lambda$=0.6696 mm), 556.936 GHz ($\lambda$=0.5386 mm), 620.700 GHz ($\lambda$=0.4833 mm), 752.033 GHz ($\lambda$=0.3989 mm), 916.171 GHz ($\lambda$=0.3274 mm), 970.315 GHz ($\lambda$=0.3091 mm), 987.926 GHz ($\lambda$=0.3036 mm), 1.0973 THz ($\lambda$=0.2733 mm), 1.11342 THz ($\lambda$=0.2694 mm), 1.16291 THz ($\lambda$=0.2579 mm), 1.20763 THz ($\lambda$=0.2484 mm), 1.22878 THz ($\lambda$=0.2441 mm), 1.41061 THz ($\lambda$=0.2126 mm), 1.60221 THz ($\lambda$=0.1872 mm), 1.66100 THz ($\lambda$=0.1806 mm), 1.66990 THz ($\lambda$=0.1796 mm), 1.71676 THz ($\lambda$=0.1747 mm), 1.79478 THz ($\lambda$=0.1671 mm), 1.79715 THz ($\lambda$=0.1669 mm), 1.86774 THz ($\lambda$=0.1606 mm), and 1.91935 THz ($\lambda$=0.1563 mm).

In the infrared range of 4 to 13 microns, there are a number of absorption frequencies in which the absorption coefficient is high enough so that the electromagnetic radiation couples well to the water vapor molecule. In this range, they are: 44.9 THz ($\lambda$=6.68 μm), 45.2 THz ($\lambda$=6.64 μm), 48.0 THz ($\lambda$=6.26 μm), 53.2 THz ($\lambda$=5.64 μm), 53.8 THz ($\lambda$=5.58 μm), 55.3 THz ($\lambda$=5.52 μm).

Throughout the spectrum there are special frequencies where the water vapor molecule favors maximum energy absorption. For example, 94.5 THz ($\lambda$=3.17 μm), 110 THz ($\lambda$=2.73 μm), 113 THz ($\lambda$=2.66 μm), 160 THz ($\lambda$=1.88 μm), 206 THz ($\lambda$=1.45 μm), 218 THz ($\lambda$=1.38 μm), 264 THz ($\lambda$=1.13 μm), 318 THz ($\lambda$=0.94 μm), 331 THz ($\lambda$=0.906 μm), 365 THz ($\lambda$=0.822 μm), 377 THz ($\lambda$=0.796 μm), 415 THz ($\lambda$=0.723 μm), 430 THz ($\lambda$=0.698 μm), 460 THz ($\lambda$=0.652 μm), 475 THz ($\lambda$=0.632 μm), 505 THz ($\lambda$=0.594 μm), 507 THz ($\lambda$=0.592 μm), 525 THz ($\lambda$=0.572 μm), 1.82 PHz ($\lambda$=0.1650 μm), and 2.42 PHz ($\lambda$=0.1240 μm).

Figure 6:
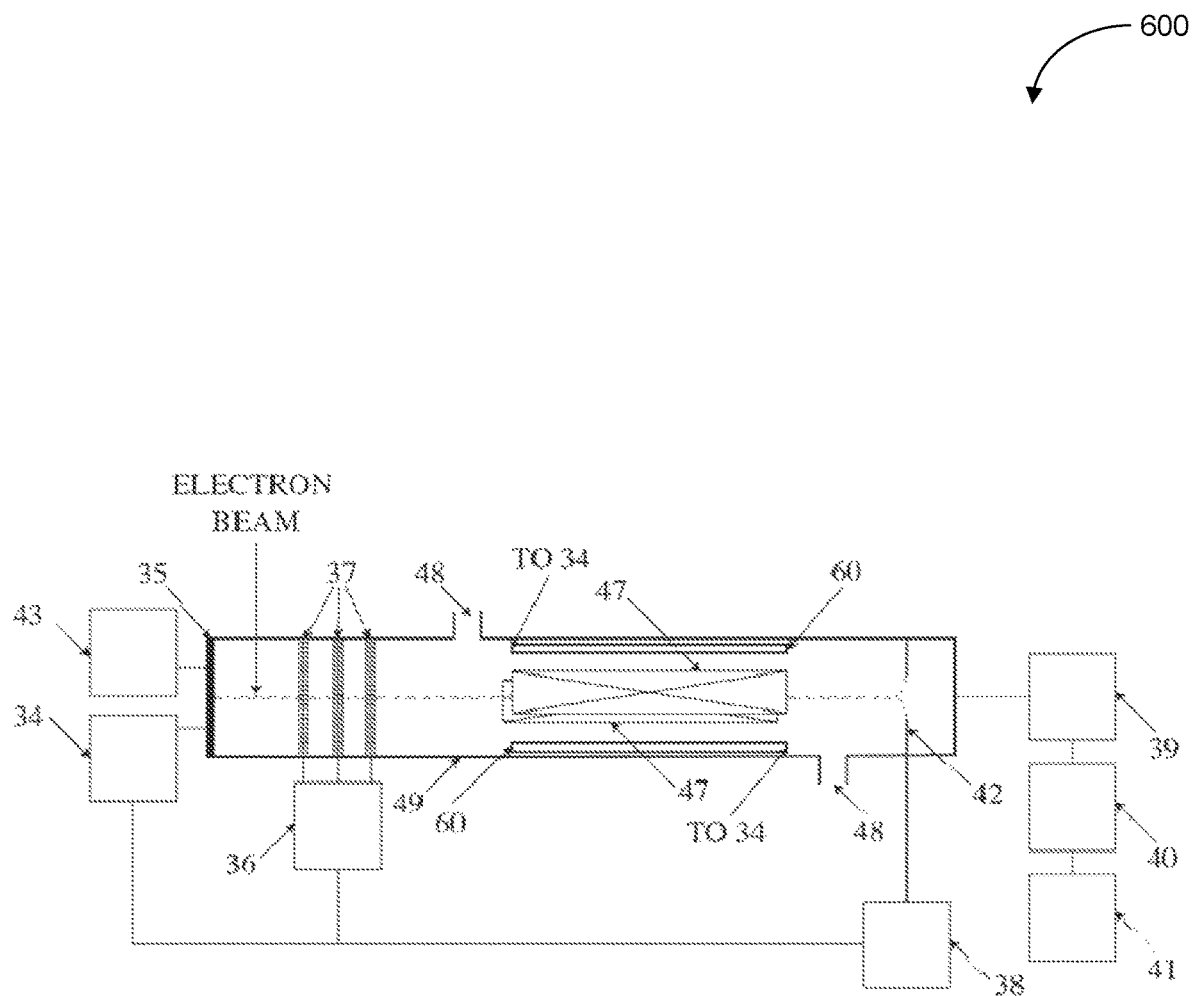
FIG. 6 illustrates a power generator that uses a selection of a narrow range of electron velocities in an electron beam to reduce the number of collector electrodes and accompanying power supply.

FIG. 6 illustrates a power generator that uses a selection of a narrow range of electron velocities in an electron beam to reduce the number of collector electrodes and accompanying power supply. Components similar to those shown in FIG. 5 are labeled in the same manner. Power generator 600 comprises parallel electrostatic deflection plates 60 and magnets 47 arranged in a perpendicular fashion within drift tube 49, as depicted in FIG. 6. The electrostatic field residing on electrostatic deflection plates 60 may be provided by cathode power supply 34. Deflection plates 60 generate an electrostatic field that is mutually perpendicular to the magnetic field generated by magnets 47. Both fields are positioned orthogonal manner to the path of the electron beam, resulting in a certain number of electrons having a specific velocity and trajectory to travel directly to collector electrode 42 in a straight line undeflected from their original path. Applying a perpendicular magnetic field relative to the velocity of the electron beam without electrostatic deflection plates parallel to the electron beam, allows for targeted separation electrons of different velocities, and hence different potentials. This, in effect, allows for selective filtering of beam electrons having a specific velocity.

In one embodiment, additional collector electrodes having varying potential are placed on either side of a main collector electrode 42 for the purpose of accepting a matching electron potential at each respective collecting electrode. As a result, the number of electrons captured by the multiple collector electrodes is increased with the electron distribution being centered about the main collector electrode 42. Additionally, it is possible to generate a pseudo-sinusoidal electron beam in order to stimulate an alternating current.

In one embodiment, an electron entering the magnetic field experiences a downward force due to the combination of the forward component of their velocity and the transverse magnetic field. This force is directed downward if the initial electron velocity is greater than that at which the electric and magnetic forces balance. The result of the downward component of velocity and the transverse magnetic field produces a backward component of force that may be sufficient to cause the electron to turn a loop. If the initial velocity is less than that for which the electric and magnetic forces are in balance, the electron will experience an upward force, which, in turn, gives a forward acceleration. The result is an undulating forward progression. This undulating forward progression resembles a sinusoid and can be used to convert the beam to an alternating current having a period that is a function of the magnetic field strength. Thus, an electron beam can directly generate an alternating current.

Figure 7:
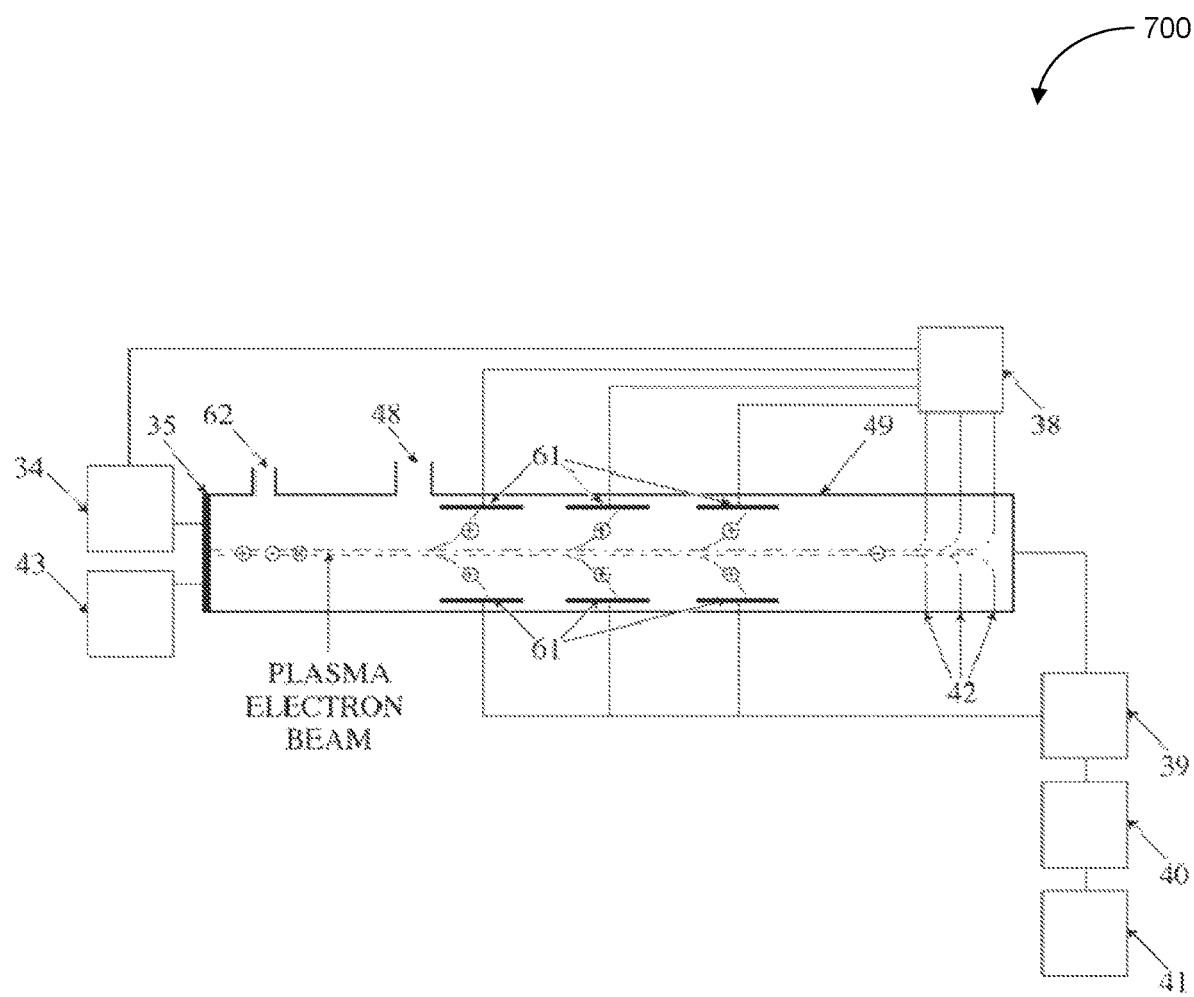
FIG. 7 illustrates a power generator in which the electron beam is a plasma electron beam, according to various embodiments of the invention.

FIG. 7 illustrates a power generator in which the electron beam is a plasma electron beam, according to various embodiments of the invention. Components similar to those shown in FIG. 6 are labeled in the same manner. For purposes of brevity, a description or their function is not repeated here. The plasma electron beam consists of neutral as well as charged species (i.e., ions and electrons). If the plasma electron beam travels at a velocity, $v$, and a magnetic field is established perpendicular to the beam, with a magnetic field strength, $B_{app}$, the interaction between the two fields induces an electric field, $E_{ind}$, that is at right angles to both $v$ and $B_{app}$ and given by the equation $$E_{ind} = v \times B_{app}.$$

It is noted that a sufficiently strong magnetic field renders a conducting gas anisotropic and, thus, the conductivity becomes a tensor quantity rather than a scalar used here for purposes of simplification. Then, per Ohm's law, the density of the current induced in the conductive fluid (i.e., the plasma) becomes $$J_{ind} = \sigma E_{ind}.$$

Simultaneously with the induced current ponder-motive force, $F_{ind}$, is induced and given by the vector product $$F_{ind} = J_{ind} \times B_{app}.$$

This force occurs because, as in an electric generator, the conducting fluid cuts the lines of the magnetic field. The equation above yields a vector perpendicular to both $J_{ind}$ and $B_{app}$. The induced force is parallel to $v$ but opposite in direction. In FIG. 7 an electric field, $E_{app}$, is applied at right angles to both $B_{app}$ and $v$, but opposite in direction to $J_{ind}$. The current density due to this applied electric field is denoted by $J_{cond}$ and called conduction current. The net current density, J, through the conducting fluid is then $$J = \sigma(E_{app} + v \times B_{app}) = \sigma(E_{app} + E_{ind}).$$

The ponder-motive or Lorentz force associated with the conduction current is then $$F = J \times B_{app} = \sigma(E_{app} + v \times B_{app}) \times B_{app}$$

If $E_{app} > v \times B_{app}$, we obtain an accelerator that can enhance power production as well as electromagnetic wave generation. This approach is superior to conventional means of producing power in that the acceleration of the fluid occurs by electromagnetic fields rather than by using large quantities of thermal energy that limit the amount of power produced and, thus, efficiency and cause thermal deterioration of the turbine generator walls. Unlike conventional magneto-hydrodynamic (MHD) power generation, this embodiment avoids the high temperatures required to generate a gas that is sufficiently ionized to have the desired high conductivity for electromagnetic acceleration.

Additional advantages over MHD reactors include that no difficult to handle and toxic (e.g, mercury or liquid sodium) conducting liquids are used. The flow of liquid metals, such as molten sodium-potassium eutectic solutions, in MHD reactors necessitates unusual pumping, controlling, and measurement techniques. In addition, cooling of the walls of the reaction chamber requires not easily obtained high heat transfer rates. Furthermore, to sufficiently cool the reactor walls that are in constant contact with the hot conductive gas, oftentimes magnets designs are employed that are fairly difficult to implement and prone to causing flow instabilities.

Power generator 700 in FIG. 7 comprises electrodes 61 and collector power supply 38 coupled to both electrodes 61 and collector electrodes 42. Electrodes 61 are arranged as a series of parallel plate pairs that are symmetrically distributed at either side of the plasma electron beam along the top and bottom ends of drift tube 49, i.e., parallel to the direction of motion for the plasma beam. However, this is not intended as a limitation, as electrodes 61 may have any shape and be positioned at other suitable locations within power generator 700. Electrodes 61 may be arranged according to sequentially decreasing negative potential, for example, to allow for different ionized species formed in the electron beam having different velocities due to their different ionic weights to be captured at more than one potential.

In order to provide ions for the plasma beam, port 62 may be used to admit gases that can be ionized in the plasma beam. These include inert gases, hydrogen, and alkali metals.

In example in FIG. 7, electrodes 61 have a higher negative potential than cathode 35 in order to attract positive ions from the plasma beam. The high negative potential of electrodes 61 permits electrons to travel from cathode 35 to the relatively lower negative potential of collector electrodes 42 without being prematurely captured by electrodes 61. Collector electrodes 42 are arranged as a series of multi-electrode collectors whose potential matches the beam potential and have a relatively higher potential than electron emitting cathode 35. This facilitates capture of electrons by electrodes 42 and provides for the recovery of energy from the plasma beam.

Figure 8:
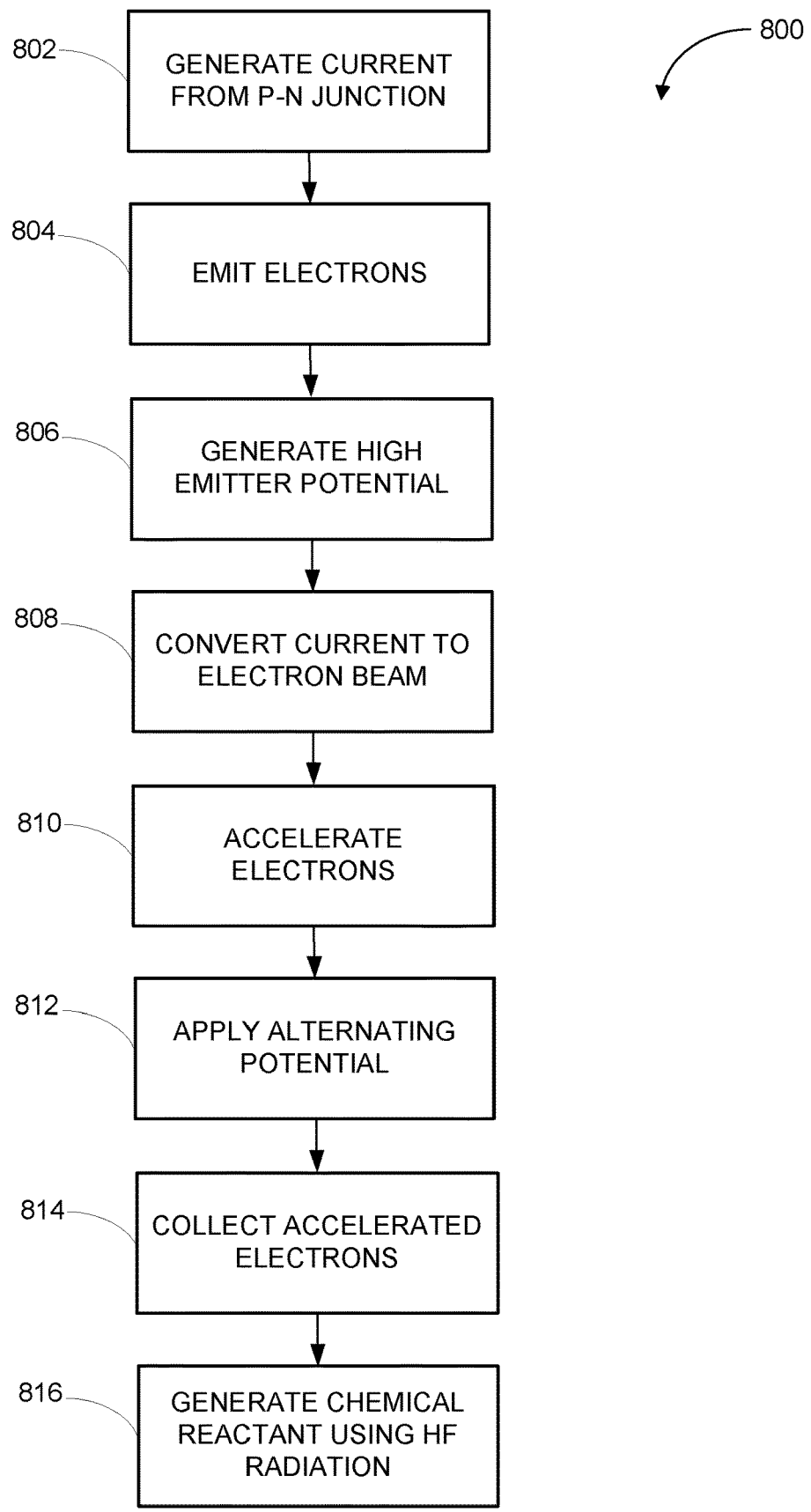
FIG. 8 is a flowchart of an illustrative process for power generation from a renewable energy source in accordance with various embodiments of the invention.

FIG. 8 is a flowchart of an illustrative process for power generation from a renewable energy source in accordance with various embodiments of the invention. At step 802, a current is generated from a p-n junction of a solar cell.

At step 804, a part of the current is applied to an emitter that emits electrons.

At step 806, a high potential is generated on the emitter, for example, by applying a part of the current to the emitter.

At step 808, current is converted into an electron beam that is emitted from the emitter.

At step 810, the emitted electrons are accelerated to a high kinetic energy level.

At step 812, an alternating potential is applied between the emitter and a collector in order to generate an alternating current.

At step 814, the electrons from the accelerated electron beam are collected, for example, to provide a second current at a potential that is lower than the emitter potential in order to drive a load.

Finally, at step 816, chemical reactants are created, for example, by using high frequency radiation created by the electron beam.

Figure 9:
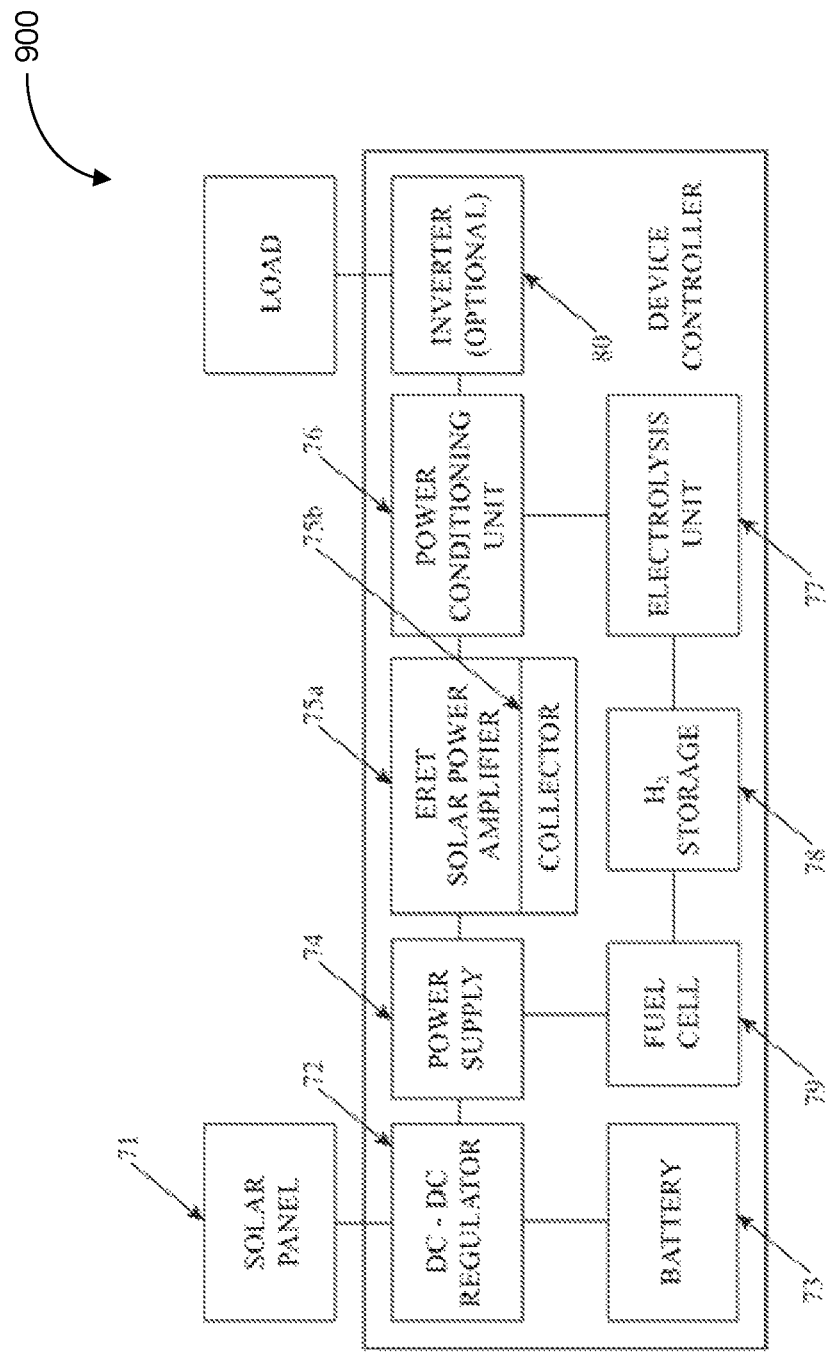
FIG. 9 is an exemplary schematic of a system to generate energy from a renewable energy source according to various embodiments of the invention.

FIG. 9 is an exemplary schematic of a system 900 to generate energy from a renewable energy source according to various embodiments of the invention. One or more solar panels 71 may be used depending on the amount of electrical power that needs to be amplified. Input of solar energy is converted to electrical charges in the form of the solar panel 71. The output of a solar panel goes into a dc-dc voltage regulator 72 and charge controller that is necessary to smooth out any variations of the output of a solar panel. This is due to the varying insolation of the Sun resulting from the variations in the Sun's position and meteorological conditions. In embodiments, fluctuations of photon capture may be mitigated by using a dc-dc voltage regulator 72.

A set of batteries (optional) 73 provide energy in these instances where the Sun's insolation is reduced to a level in which the stored hydrogen is utilized to generate electricity from a fuel cell to provide power.

A power supply 74 operates the solar amplifier. The input of the power supply may use either direct or alternating current. It is preferred that the power supply run on dc since the output of the regulator is dc. Since solar power is direct current in nature, an additional inverter is needed for the power supply if it is an alternating current power supply. The solar amplifier 75a takes the input from the power supply 74 in order to amplify the current generated in the amplifier. The collector 75b, which is a component of the solar amplifier whose purpose is to collect the high energy electrons generated by the emitter (not shown) and let it be converted to a conductive current. The current output goes to a transformer to step down the voltage and filter out any noise that may have been generated, where the transformer and filter are collectively referred to as the power conditioning unit 76. Power from the power conditioning unit 76 is split into two streams. One circuit goes to generate hydrogen in the electrolysis unit 77. The produced hydrogen is sent to a storage unit 78, which is used by the fuel cell 79 in order to provide electrical power to the power supply when the solar insolation is not sufficient enough to warrant the use of the solar panel. Inverter 80 is an optional component only if the solar amplifier is run in dc mode. The output of the power conditioning unit 76 then goes to an electrical load.

Figure 10:
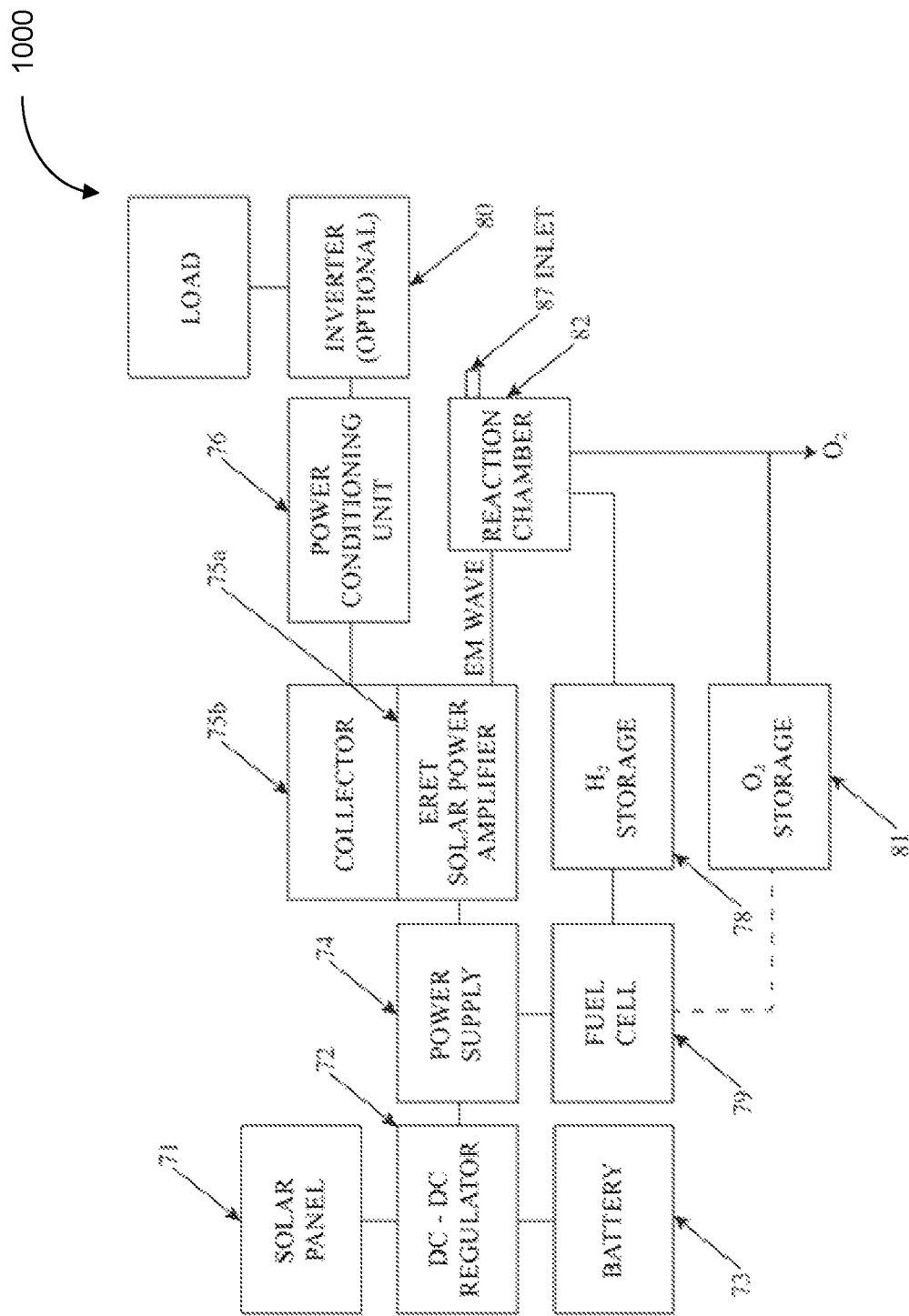
FIG. 10 is an exemplary schematic of a system to generate energy from a renewable energy source according to various embodiments of the invention.

FIG. 10 is an exemplary schematic of a system 1000 to generate energy from a renewable energy source according to various embodiments of the invention. The system 1000 is similar to the system 900, with a difference that the electromagnetic waves generated by the accelerating electrons in the solar amplifier (75a and 75b) produce coherent electromagnetic radiation that may dissociate water vapor under certain conditions.

One or more solar panels 71 may be used depending on the amount of electrical power that needs to be amplified. Input of solar energy is converted to electrical charges in the form of a solar panel 71. The output of a solar panel goes into a dc-dc voltage regulator 72 and charge controller that is necessary to smooth out any variations of the output of a solar panel. This is due to the varying insolation of the Sun resulting from the variations in the Sun's position and meteorological conditions.

A set of batteries (optional) 73 provides in order to provide energy in these instances where the Sun's insolation is reduced to a level in which the stored energy from the battery or alternatively of stored hydrogen generated from the production of electromagnetic radiation tuned to various absorption frequencies of water vapor is utilized to generate electricity from a fuel cell to provide power. A power supply 74 operates the solar amplifier. The input of the power supply 74 may use either direct current from a fuel cell 79 or if enough hydrogen has been stored, the fuel cell may be used as a power source during night time hours. The advantage of using the power supply in conjunction with a fuel cell is that the consumption of hydrogen in the fuel cell is greatly reduced since the power supply is generating the high potential energy needed to increase power output. It is preferred that the power supply run on dc since the output of the regulator is dc.

The solar amplifier 75a takes the input from the power supply 74 in order to amplify the current generated in the amplifier. Both ac and dc current can be generated in the solar amplifier. The collector 75b, which is a component of the solar amplifier whose purpose is to collect the high energy electrons generated by the emitter (not shown) and let it be converted to a conductive current. The current output goes to a transformer to step down the voltage and filter out any noise that may have been generated. The advantage of this configuration is that none of the electrical power of the beam is used to produce hydrogen such as shown in FIG. 9.

The electrons accelerating in the space between the emitter/cathode and the collector produce coherent electromagnetic waves that can be manipulated to selectively be absorbed in the water vapor molecule. If the energy density is high enough, then dissociation occurs and hydrogen and oxygen can be recovered separately via a membrane. The oxygen can be stored in a storage 81 or vented since the oxygen from the air could be used as an oxidizing source for the fuel cell. The reaction chamber 82 is designed in such a way as to fully utilize the energy in the electromagnetic wave by generating a geometry so as to create a resonating structure (see FIGS. 16A, 16B, 17). The produced hydrogen is sent to a storage unit 78, which is used by the fuel cell 79 in order to provide electrical power to the power supply when the solar insolation is not sufficient enough to warrant the use of the solar panel. Inverter 80 is an optional component only if the solar amplifier is run in dc mode. The output of the power conditioning unit 76 then goes to an electrical load.

Figure 11:
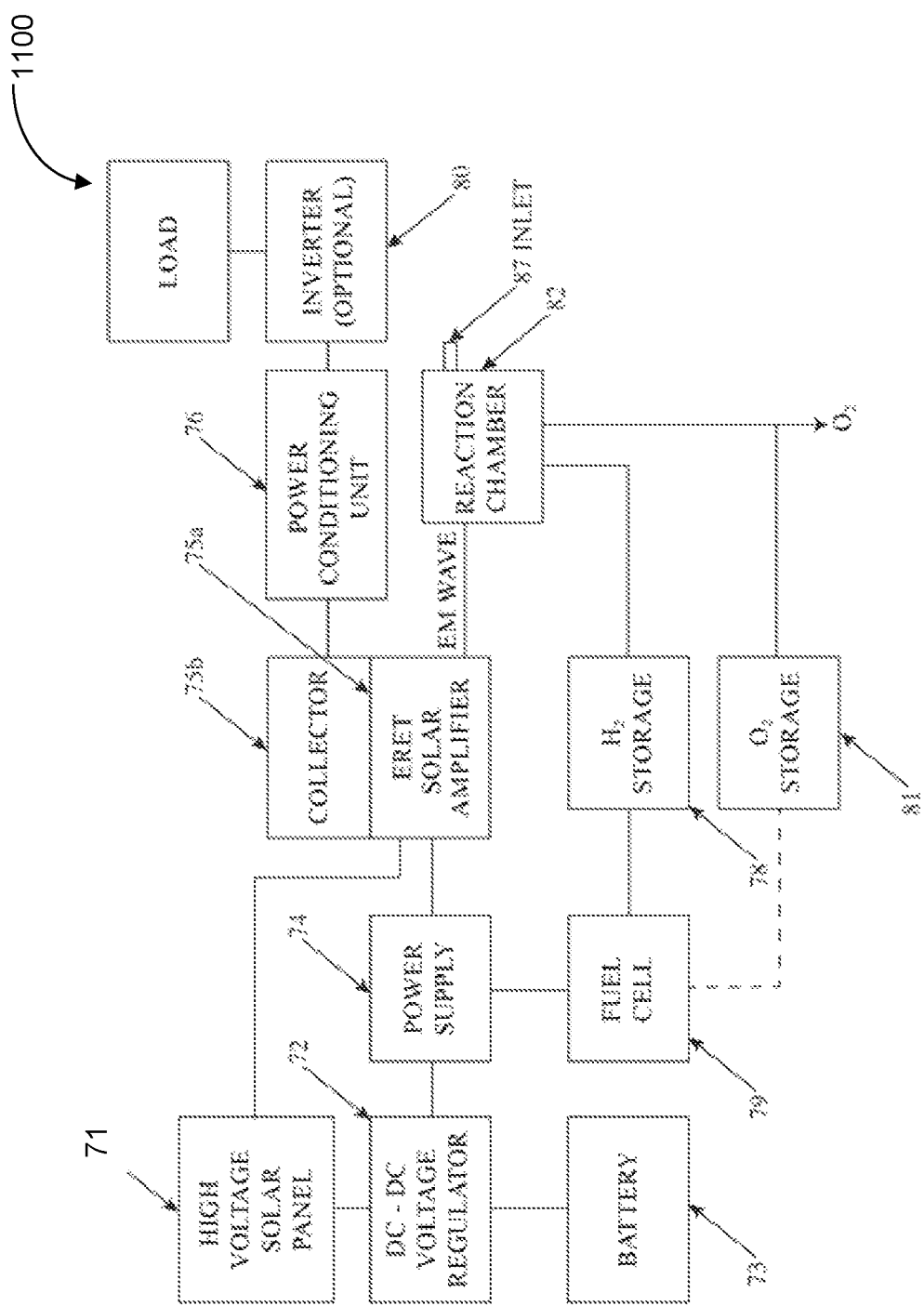
FIG. 11 is an exemplary schematic of a system to generate energy from a renewable energy source according to various embodiments of the invention.

FIG. 11 is an exemplary schematic of a system 1100 to generate energy from a renewable energy source according to various embodiments of the invention. The system 1100 is similar to the system 1000, with a difference that a solar panel 71 possessing a higher potential energy output is used. By generating high potential energy, an important function of the power supply 74 may be eliminated. The use of the power supply at night is thereby optional as shown in FIG. 11. In embodiments, the high voltage panels 71 can be constructed using different paths. Since voltage is linearly additive, constructing a higher density of solar cells will increase the net output voltage. Another way is to use the anomalous photovoltaic effect. Some semiconductors in the form of a thin-layer exhibit a high voltage photovoltaic effect. Over distances of the dimensions of a standard solar panel (1 m$^2$), it is possible to generate very high voltages. One could also use the Dember effect to generate high voltages.

Thermionic emission is a process by which the emission of electrons may take place. If an electron, moving with a sufficiently high velocity, strikes a surface, the impact may cause other electrons to escape from the surface. These are called secondary electrons and the phenomenon just described is called secondary emission. The number of secondary electrons varies with the velocity of the impacting, or primary, electrons and with the chemical nature and the physical conditions of the surface on which they strike.

The secondary emission from any given surface increases with increasing velocity of the primary electrons passing through a maximum and then declining in number. The number of secondary electrons produced can vary with the material. There are several materials that have high emission of secondary electrons. The ratio or the number of secondary electrons emitted per incident primary electron is called the secondary emission ratio $$\left(=\frac{I_s}{I_i}\right),$$

where, $I_s$ is the electron current (number of secondary electrons) of secondary electrons generated, $I_i$ is the primary electron current. In embodiments, one or more of MgO, ZnO, polycrystalline CVD diamond, AgMgO(Cs), CuBeO (Cs) and $Al_2O_3$ are used as secondary electron emitters (more specifically, secondary emission coating) to increase the beam current in order to generate higher powers, as shown in FIG. 12.

Figure 12:
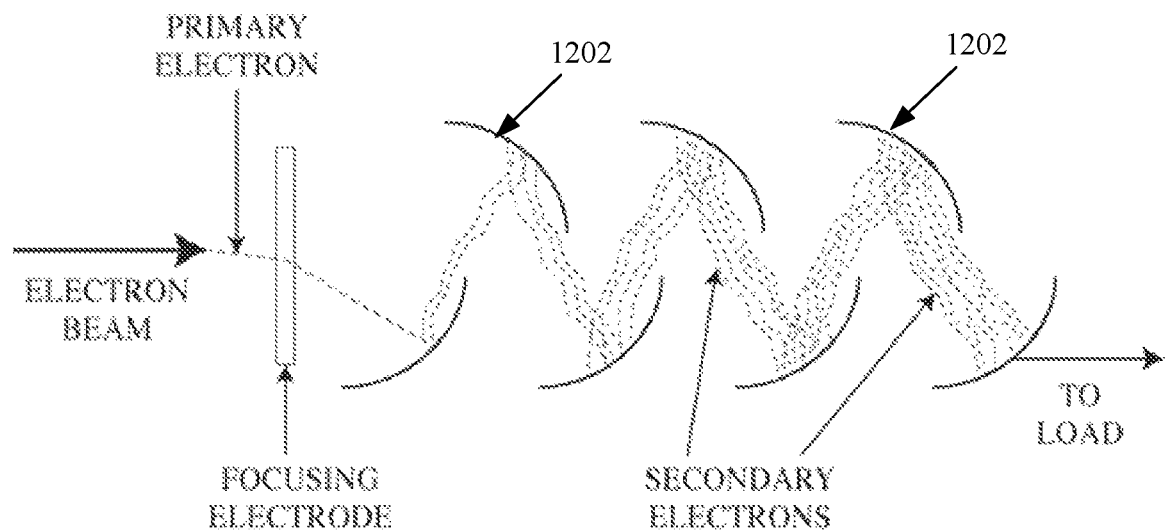
FIG. 12 shows an exemplary arrangement of electron collectors according to various embodiments of the invention.

FIG. 12 shows an exemplary arrangement of electron collectors according to various embodiments of the invention. In embodiments, a secondary emission coating may be disposed on the surface of one or more of the collectors. The momentum of the electrons coming from the electron beam causes the removal of more than one electron from the surface coating of the collector, thereby dislodging electrons on the surface of the collector. These materials have very low surface work functions, which is the energy needed to eject the electron from the material. Typical materials are made of compounds of silver-oxygen-cesium and antimony-cesium. As shown in the figure, there are a number of collector stages (or collector electrodes) 1202, where electron multiplication takes place. The number of electrons increase as the number of stages increase until the last stage. If one electron can generate m secondary electrons at each collector stage, the current gain after N stages is, $$G = i_{out}/i_{in} = m^N$$

For example, if N=10 and m=5, then G=10$^7$ or a gain of 140 dB. A focusing electrode is used to direct the beam on the first stage collector.

Depending on the amount of power recovery, the collector may include one stage or multiple stages, i.e., the collector may include one or more collector electrodes 1202. Each stage needs to have a potential that is near the potential of that part of the beam that matches it. As each part of the beam matches its potential with the collector potential, the sum total of those currents issuing from the multistage collector adds up to the total beam current. If the potential is in the thousands of volts, a step-down transformer may be applied to the multistage collector at various points on the high side of the transformer, in order to reduce voltages to a common useable voltage such as 110 or 120 volts. Each stage may have a coating of a high secondary emission material as described above or any from a class of compounds in which the secondary emission coefficient is >1. The current is multiplied or amplified according to the process conditions of the device and the nature of the material and properties of the electron beam. In embodiments, the amount of current is related to the number of collector stages as: $\delta=(I_s/I_i)^n$ where n is the number of stages of the collector. For example, a two-stage collector with a diamond coating could have an amplification of 6,400 times the original current. In addition, the same principle may be used to generate the primary electrons. For example, a thermionic emitter can be used to initiate an electron beam, the beam interacts with a number of stages in which it has a high secondary emissive material on its way to the collector, increasing the net beam current. As it travels through the drift tube which lies between the electron generator assembly and the collectors 100, the beam encounters a multistage collector with additional stages to produce additional current if a secondary electron emissive surface is coated on each stage of the collector surface. Care needs to be taken to eliminate back recoil to the cathode in these instances. Also, in embodiments, in a manner similar to photomultiplier tubes, one may initiate the beam current by using the sunlight or a combination of photo-emissive and thermionic materials.

Figure 13:
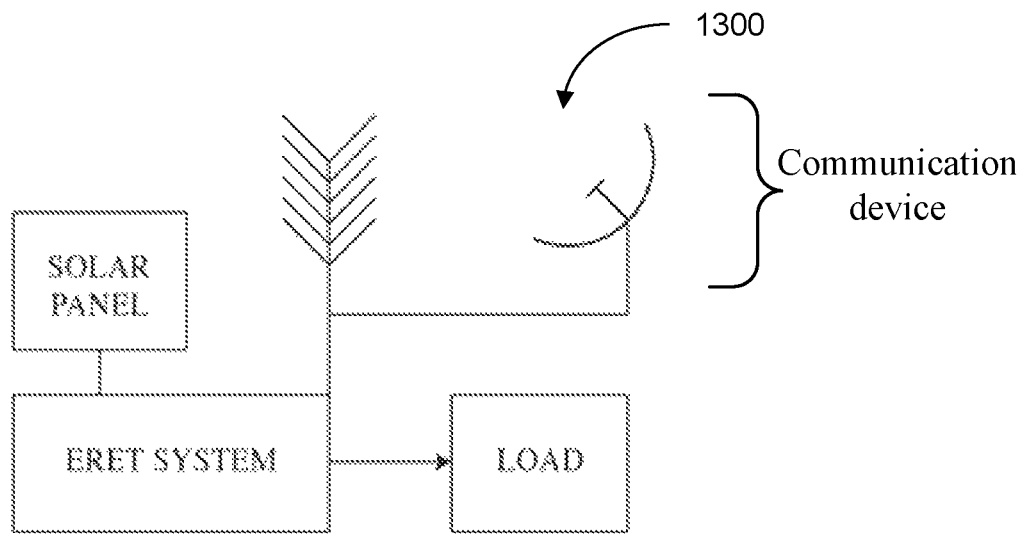
FIG. 13 is an exemplary schematic of a power generator having a communication device according to various embodiments of the invention.

Focused electromagnetic radiation may be used to transmit and receive electromagnetic signals that may be used for a variety of communications as illustrated in FIG. 13. FIG. 13 is an exemplary schematic of a power generator having a communication device 1300 according to various embodiments of the invention. FIG. 13 illustrates one exemplary application of the power generators described in conjunction with FIGS. 1-12.

The acceleration of electrons can create coherent electromagnetic waves, with the judicious use of magnets and resonators as described earlier in the disclosure. As depicted in FIG. 13, in embodiments, the electromagnetic waves generated by the power generator system may be used to send information to and from the power generator system, using the communication device 1300, such as antenna. In embodiments, since there is no limit on the frequency of transmission and reception, it is possible to have wide broadband communications with this embodiment of this invention.

Figure 14:
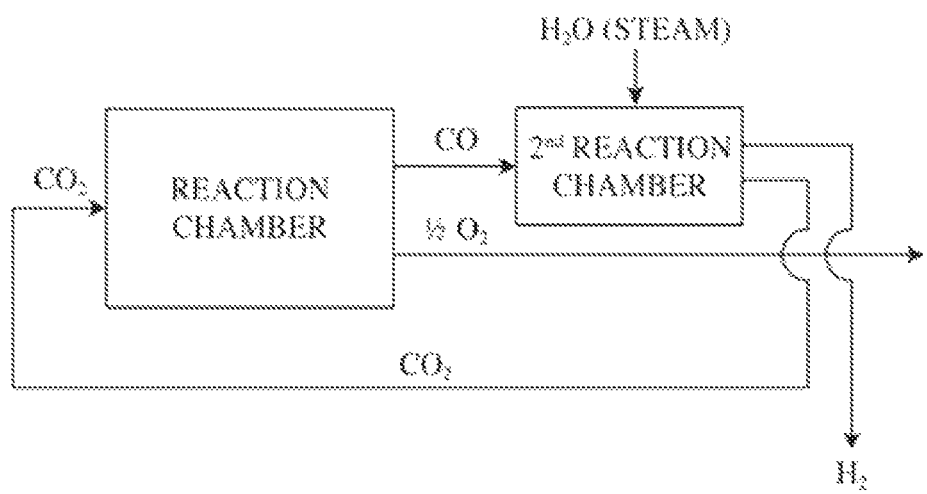
FIG. 14 is an exemplary schematic of a chemical reacting system according to various embodiments of the invention.
Figure 15:
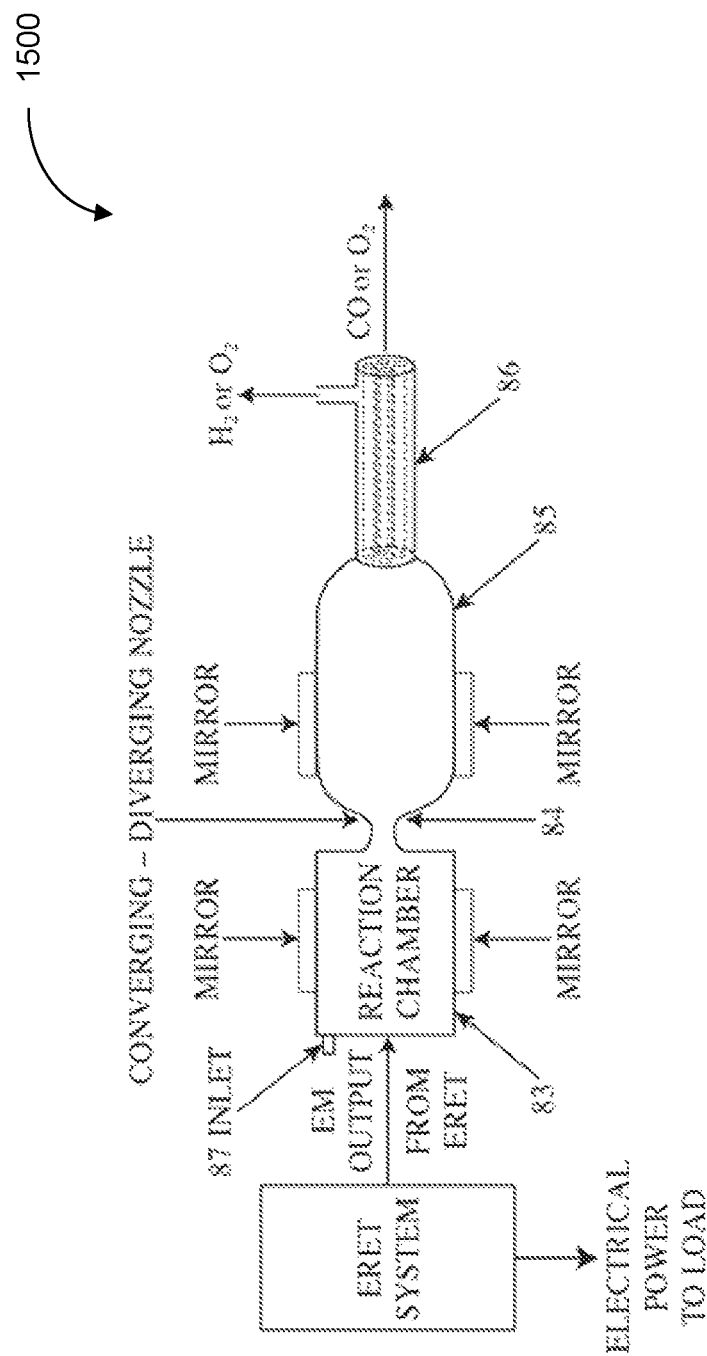
FIG. 15 is an exemplary schematic of a chemical reacting system according to various embodiments of the invention.

FIG. 14 is an exemplary schematic of a chemical reacting system according to various embodiments of the invention. The reaction chamber is used to accept the coherent electromagnetic radiation. The coherent radiation is tuned to the absorption frequency of the reactant (in this case carbon dioxide). The reaction chamber may also contain a membrane for the separation of products. In this example, carbon dioxide is dissociated to carbon monoxide and oxygen. The carbon monoxide enters a second chamber with steam as a reactant to convert the steam into hydrogen. The oxygen reacts with the carbon monoxide molecule to form carbon dioxide as shown in the following formula, $CO+H_2O=CO_2+H_2$ FIG. 15 is an exemplary schematic of a chemical reacting system 1500 according to various embodiments of the invention. This figure shows how a chemical reaction can be achieved. The output of these reaction, for example, $CO_2=CO+\frac{1}{2}O_2$ and/or $H_2O=H_2+\frac{1}{2}O_2$ is electromagnetic radiation at specific frequencies that correspond to maximizing the absorption of electromagnetic radiation. As stated earlier in this disclosure, the various absorption frequencies for water vapor have been stated. In the case of another molecule, namely carbon dioxide, certain frequencies maximize absorption of radiation. Some of them are listed below:

667.3 cm$^{-1}$, 1285.5 cm$^{-1}$, 1388.3 cm$^{-1}$, 2349.3 cm$^{-1}$, 3609 cm$^{-1}$, 3716 cm$^{-1}$

In this configuration, there are two mirrors on either side of the reactor chamber 83 as well as the diverging section of the nozzle 84. This is done to create a standing wave as found in a typical laser geometry in order to maximize the intensity of the incoming radiation. A membrane at the diffuser end 85 of the converging-divergent nozzle arrangement is used to bring up the pressure to more easily effect separation. Detailed description of the mirrors in the system 1500 is given below in conjunction with FIGS. 16A and 16B.

In order to sustain the electromagnetic wave, it is important to maintain the integrity of the wave. This is accomplished by using a resonating cavity. A resonating cavity is simply an enclosure where the primary energy wave becomes a standing wave. Thus, a wave and its harmonics may fill the entire cavity. FIGS. 10, 11, 14 and 15 show the reaction chamber 82. In embodiments, a resonating cavity is used so that the maximum efficiency is attained. In terms of efficiency, we can also measure that by using a factor called Q, quality or simply the quality factor. It is a measure of the cavity to maintain and store energy versus losses of energy leaving the cavity or, $Q$=energy stored in the resonator/energy lost from the resonator In order to efficiently use the energy to its maximum for any given reaction of a chemical mixture, it is important to attain very high values of Q for endothermic reactions and low values of Q for exothermic reactions. In order to dissociate water or carbon dioxide to given as an example, the following chemical reaction and energy necessary to produce hydrogen and oxygen molecules and carbon monoxide and oxygen molecules are given below:

$CO_2=CO+\frac{1}{2}O_2$ Delta H=+2.9 eV/molecule $H_2O=H_2+\frac{1}{2}O_2$ Delta H=+2.6 eV/molecule The above two reactions require additional energy to break their bonds and recombine to products. The cavity with a very high Q factor may store energy to be used for bond dissociation. In addition, the effective absorption path is increased with higher quality factors.

There are other cases where a chemical mixture causes an exothermic reaction and it is important to reach low Q levels in order to remove energy from the resonating cavity reactor so only the forward reaction path is maintained. An example of an exothermic chemical reaction that produces hydrogen, may be:

$CO+H_2O=CO_2+H_2$ Delta H=−0.4 eV/molecule

The above quantities for the energy is called the enthalpy of dissociation, Delta H, and is an equilibrium thermodynamic quantity assuming an infinite reaction time. In order to speed up the reaction, we may put energy in order to reduce the reaction time. Quickly overcoming the activation energy is the way to accomplish that goal. Increasing the energy density leads to higher energy states of the molecules which lead to dissociation. The is why focusing the electromagnetic energy into a smaller region as shown in FIG.

16B leads to high energy densities. Multiphoton absorption of the energy into the reactant molecule leads to higher energy states. In order to achieve that goal for any particular frequency focusing the energy into a smaller volume results in an improvement in the probability that the photon may be absorbed by the reactant molecule. As an example, here is a calculation determining the probability a photon will be absorbed by a water molecule.

The definition of irradiance is given below:

$I$=Irradiance=energy/area*time $I$=(# photons)*(photon energy)/(volume*time/length)

$I$=(# photons)*(photon energy)/(volume/speed of light)

Or, $I=Nh\nu/(V/c)$

Or, $N=(I/ch\nu)V$

Where, N is the number of photons, $\nu$ is the frequency of the radiation of absorption, c is the speed of light=3E08 meters per second, h is the Planck's constant=6.626E-34 Joule-seconds, NA is the Avogadro's number=6.02e23 molecules per mole, V is the volume of interest for the interaction of the photon with the molecule. The volume of a water molecule is $$V = \text{molecular weight}/\text{density} * N_A,$$
$$= 18 \text{ gr mole}^{-1}/(1 \text{ gr/cm}^3)*(10^6 \text{ cm}^3 \text{ m}^{-3}*6.02\times 10^{23})$$
$$= 2.99 \times 10^{-29} \text{ m}^3 \text{ molecule}^{-1}$$

The number of photons in this volume at a wavelength where water vapor absorbs electromagnetic radiation may be chosen from the absorption spectrum of water vapor. We also see from the above equation where the number of photons for absorption can increase if the irradiance level is high and also a frequency as low as possible for high absorption is also chosen. We may choose the sub-millimeter range in the water absorption spectrum at a frequency of 556.936 GHz (0.5386 mm) to show as an example because of its very high absorption characteristics. Therefore, $$N = 2.99 \times 10^{-29} \text{ m}^{-3}/(3\times 10^8 \text{ m sec}^{-1})(6.626\times 10^{-34} \text{ J secs})$$
$$(5.56936\times 10^{11})$$
$$= 2.7008\times 10^{-16} \text{ m}^{-2} \text{ secs}^{-1} \text{ J I}$$

Figure 16A:
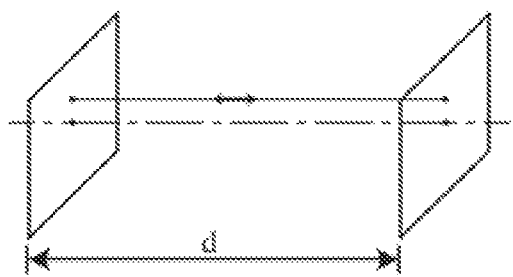
FIGS. 16A and 16B show exemplary arrangements of minors according to various embodiments of the invention.
Figure 17:
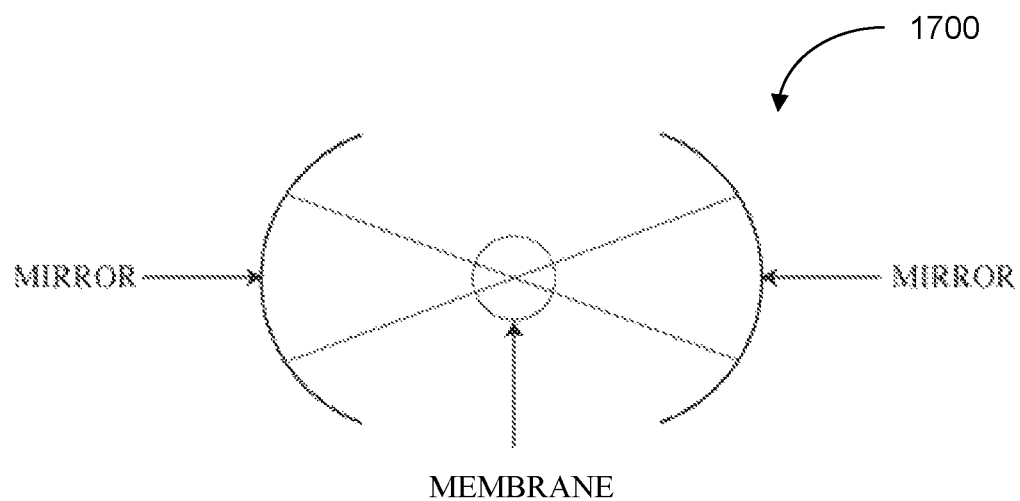
FIG. 17 is an exemplary schematic of a chemical reacting system according to various embodiments of the invention.

It is apparent from the above quantity of photons that the irradiance needs to be high in order to improve the probability of interaction of the photon with the water molecule. An irradiance of $I=3.702\times 10^{15}$ J secs$^{-1}$ m$^2$ is necessary to have a probability of one photon interacting with one water molecule. It should be pointed out that the size of a photon in this case is huge since the wavelength of the photon wave is 0.536 mm or 538.6 microns in length compared to an average length of a water molecule to be around $3.1\times 10^{-10}$ m or $3.1\times 10^{-4}$ microns, or six orders of magnitude smaller. This high irradiance can be accomplished in different ways as taught in this disclosure. In order to obtain high irradiance several factors must be considered. First the Q of the resonating cavity must be at its highest. The energy may be further concentrated as shown in FIGS. 16A and 17. Lastly, pulsing the energy by Q switching and mode-locking is necessary to obtain high irradiances. In order to raise the value of Q we have to observe its relationship to the frequency, $Q=\nu/\Delta\nu$ where, $\nu$ is frequency and $\Delta\nu$ is linewidth of the output of the electromagnetic radiation produced in the solar amplifier of this disclosure.

The narrower the bandwidth the greater the value of Q. The value for Q for two mirrors of different reflectivities, $R_1$ and $R_2$ with a separation between the mirrors of a length, d, we have, $Q=2\pi d\nu(R_1R_2)^{0.25}/c[1-(R_1R_2)^{0.50}]$ Or, for two mirrors with equal reflectivity, $R_1=R_2$, then, $Q=2\pi d\nu(R_1)^{0.50}/\!/c[1-R_1]$ Using the above value for the frequency, $\nu$, $R_1=R_2=0.99$ and d=1 meter for the length of the cavity, we get $Q=1.16638\times 10^8$, a very high value. In order to fulfill the other requirement to produce enough photons to sustain a high efficient absorption of electromagnetic waves into the water molecule, the irradiance needs to be above a certain critical value.

Figure 16B:
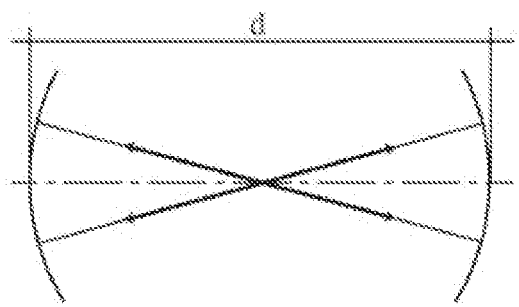

Another method for maximizing energy density in order to generate a chemical reaction is pulsing the coherent electron beam. This will generate huge power gradients in the resonating cavity, especially the configuration where there is a focus of the two mirrors (see FIGS. 16*b* and 17). The reactant molecules can be excited first by an electrical discharge, followed by a pulse of the electron beam, thereby generating focused electromagnetic radiation in the form of a pulse that travels through the excited reactant molecules, resulting in a chemical reaction. This is further enhanced by use of the geometric arrangement as illustrated in FIGS. 16*b* and 17. For example, if the electron beam is pulsed at 1 microsecond intervals (1 μsec=1×10$^{-6}$ secs) and the energy generated during the pulse is 1,000 Joules, the power produced during the pulse, Pulse power=pulse energy/pulse duration Or, 1000 joules/1×10$^{-6}$ secs=1,000 MW or 1' GW Q-switching and mode-locking are two methods by which short intense pulses of high energy can be generated. The standard method is to block one of the mirrors when the medium is active. By unblocking the mirror, a build-up of inverted molecules releases their photons to generate very high powers. Mode-locking allows the shortest pulses to be produced in a resonating cavity. The many longitudinal modes in the cavity are made to oscillate in phase. By inserting a special optical element in the cavity makes all the modes oscillate together. Q-switching is similar in nature in that a method or optical element is placed in the path of the light between the mirrors in order to generate high quantities of excited species. In this invention, high energy pulsed coherent electromagnetic radiation is generated by pulsing the electron beam in the solar amplifier (75*a*, 75*b*). A grid which lies between the cathode and collector is pulsed so that bundles of electrons in phase with each other are emitted. Due to the acceleration of these bunches of electrons, coherent radiation is emitted where it enters the reaction chamber 82. If the reaction chamber 82 has excited species generated by a discharge, the pulse of electromagnetic radiation may increase the number of excited species and hence, the number of inverted molecules and amplify their presence. In embodiments, the entering focused electromagnetic radiation may enter the reaction chamber 82 through a window or lens if the energy density needs to increase further.

FIGS. 16A and 16B show exemplary arrangements of mirrors according to various embodiments of the invention. FIG. 17 is an exemplary schematic of a chemical reacting system 1700 according to various embodiments of the invention. In embodiments, as depicted in FIG. 16A, a pair of flat mirrors may be used to form a resonating cavity. In alternative embodiments, as depicted in FIG. 16B, a pair of confocal mirrors may be used to form a resonating cavity and also focus the electromagnetic radiation. FIGS. 16A and 16B illustrate two methods to achieve maximum utilization of the electromagnetic wave. Parallel plates or confocal mirrors are used to direct the radiation in order to setup a standing wave. FIG. 16B illustrates a standing wave with a focus midway between the two mirrors. FIG. 17 illustrates this point with a membrane at the center of the focus. Reactant material may flow within the membrane (perpendicular to the page). The density of the radiation (where most of the reaction occurs) may be highest at the focal point. Products leave the membrane perpendicular to the flow as well as parallel in the direction of the flow within the membrane.

As a variant of this method, a second reactor as shown in FIG. 14, uses another reactant (in this illustration, steam) in order to use one of the products of the reaction chamber, carbon monoxide (CO), to produce hydrogen and carbon dioxide. The carbon dioxide is recycled to produce more CO. Other processes involving CO+H2 may be achieved by this method. In some cases, a catalyst may be needed to speed up the reaction. A catalyst may be used in either chamber in order to generate a myriad of chemicals. For example, reduction of metal ores to metals using carbon monoxide and/or hydrogen is an example. Another variation is illustrated in FIG. 15. In this approach, a first reaction chamber dissociates the reactant material as disclosed above. The products of that reaction then travel through a converging-diverging nozzle 84 in order to "freeze" the products. A second set of mirrors are used to generate standing waves for further reaction until separation of the products occur in the diffuser section 85 of the reaction zone. In FIG. 17, the membrane 86 separates the products. Both electromagnetic radiation and the generation of free electrons can be used to initiate and promote the dissociation of the reactant(s) to products. Supersonic speeds result in the diffuser section 85. Carbon dioxide may be dissociated using He, $N_2$ and/or $H_2O$ as energy catalysts.

As shown in FIG. 17, the chemical reacting system 1700 may include a pair of confocal mirrors that form a resonance cavity and a membrane disposed inside the resonance cavity. The arrangement of FIG. 17 leads to a further increase in the energy density, compare to the arrangements in FIGS. 16A and 16B.

Figure 18:
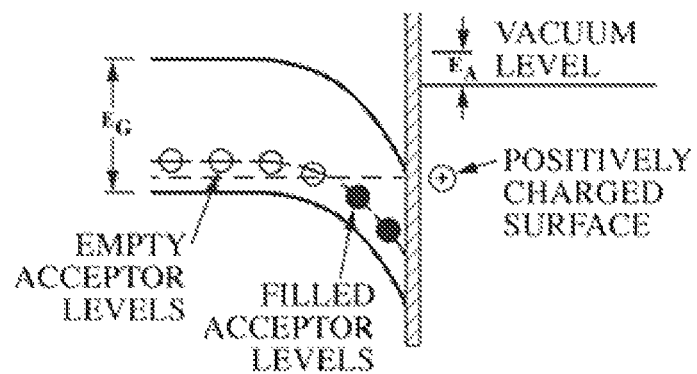
FIG. 18 illustrates an exemplary energy band structure of an emitter according to various embodiments of the invention.

FIG. 18 illustrates an exemplary energy band structure of an emitter according to various embodiments of the invention. More efficient emitters can be used as shown in this figure. Improvement of emission can be attained through a deliberate modification of the energy band structure. In embodiments, the approach has been to reduce the electron affinity, Ea. Thus, permitting the escape of electrons which have been excited into the conduction band at greater depths within the material. If the electron affinity is made less than zero (the vacuum level is lower than the bottom of the conduction band, a condition described as "negative electron affinity" and illustrated in this figure.

Improvement of emission may be attained through a deliberate modification of the energy band structure. In embodiments, the approach has been to reduce the electron affinity, Ea, thus permitting the escape of electrons which have been excited into the conduction band at greater depths within the material. If the electron affinity is made less than zero (the vacuum level is lower than the bottom of the conduction band, a condition described as "negative electron affinity" and illustrated in FIG. 18. The escape depth may be as much as 100 times greater than for the normal material. For example, the escape depth of a photoelectron is limited by the energy loss suffered in phonon scattering. Within a certain period in time, typically on the order of $10^{-12}$ seconds, the electron energy drops from a level above the vacuum level to the bottom of the conduction band from which it is not able to escape into the vacuum. On the other hand, the electron can stay in the conduction band in the order of $10^{-10}$ seconds without further loss of energy, i.e. without dropping the valence band. If the vacuum level is below the bottom of the conduction band, the electron may be in an energy state from which it can escape into the vacuum for a period of time that is approximately 100 times longer than if an energy level above the bottom of the conduction band is required for escape.

In embodiments, several approaches to reduce the electron affinity may be applied. As an example, the semiconductor emitter is made strongly p-type by the addition of the proper "doping" agent. If gallium arsenide is the host material, zinc may be incorporated into the crystal lattice to a concentration of perhaps 1,000 parts per million. The zinc produces isolated energy states within the forbidden gap, near the top of the valence band, which are normally empty but which will accept electrons under the proper circumstances. The p-doped material has its Fermi level just above the top of the valence band. Next is to apply to a semiconductor a surface film of an electropositive material such as cesium. Each cesium atom becomes ionized through loss of an electron to a p-type energy level near the surface of the semiconductor and is held to the surface by electrostatic attraction. The changes which result in the energy band structure is two-fold in extent. First, the acceptance of electrons by the p-type impurity levels is accompanied by a downward bending of the energy bands. This bending could be understood by observing that a filled state must be, in general, below the Fermi level; the whole structure near the surface is bent downward to accomplish this result. Secondly, the potential difference between the charged electropositive layer (cesium) and the body charge (filled zinc levels) results in a further depression of the vacuum level as a result of a dipole moment right at the surface. The reduction of electron affinity can also be described if one were to consider the surface of the emitter as a capacitor. The charge on one side of the capacitor is represented by the surface layer of cesium ions; the other charge is represented by the region of filled acceptor levels. The reduction in the electron affinity is exactly equal to the potential difference developed across the capacitor.

Semiconductors with negative electron affinity provide an alternative way to achieve low work function materials because the Fermi level could be increased in the band gap by process and doping techniques, while the surface termination may maintain the vacuum level below the conduction band minimum. In a semiconductor, the electron affinity is the difference between the vacuum energy level and the conduction band minimum. The term negative electron affinity (NEA) refers to the condition where the vacuum level lies below the conduction band minimum. An electron with an energy greater than or equal to the conduction band minimum can escape into vacuum without an energy barrier at the surface of the semiconductor. Thus, an NEA surface may be expected to enhance cathode emission. FIG. 18 shows the band diagram of an n-type semiconductor with a negative electron affinity. The work function of the material is very sensitive to the materials surface conditions, such as absorbed or evaporated layers, surface reconstruction, surface charging, oxide layer imperfections, surface and bulk contamination, etc.

The wide band gap semiconductors of diamond and $Al_xGa_{1-x}N$ alloys have been shown to exhibit a small or negative electron affinity. This means that electrons excited into the conduction band may be emitted into a vacuum with little or no barrier. Thus n-type doping of the materials may provide electrons in the conduction band for efficient thermionic emission. The approach for preparing an n-type diamond can be accomplished employing nitrogen doping. Nitrogen is known to be a relatively deep donor with a level at 1.7 eV below the conduction band minimum. However, simple calculations indicate that at temperatures of 500-600 C, the Fermi energy would reside about 1.5 eV below the conduction band minimum resulting in an effective work function of 1.5 eV. Band bending effects would increase this value.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

The invention claimed is:

1. A power generating apparatus to generate energy from a renewable energy source, the power generating apparatus comprising:
an emitter to convert a first current that has been derived from a solar cell into a coherent electron beam, the emitter having a first single potential;
a collector having a second potential to accelerate electrons in the coherent electron beam, the collector provides a second current that is capable of driving a load, the collector comprises a secondary electron emissive surface to generate secondary electron emission; and
an electromagnetic radiation device to generate electromagnetic radiation at a frequency substantially equal to an absorption frequency of a predetermined chemical reactant to generate hydrogen from water vapor.

2. The power generating apparatus according to claim 1, further comprising:
a reaction chamber configured to generate a standing wave of the electromagnetic radiation at the frequency substantially equal to the absorption frequency and additional standing waves of the electromagnetic radiation at one or more harmonic frequencies of the standing wave.

3. The power generating apparatus according to claim 2, further comprising:
a pair of mirrors forming a resonance cavity that increases a path length of the electromagnetic radiation in the reaction chamber.

4. The power generating apparatus according to claim 3, wherein the mirrors are concave mirrors that focus the electromagnetic radiation into a region inside the reaction chamber, further comprising:
a membrane transparent to the electromagnetic radiation and disposed in the region, the membrane separates reactants from products.

5. The power generating apparatus according to claim 2, further comprising:
a converging-diverging nozzle for receiving a mixture that includes excited reactants from the reaction chamber and freezing the excited reactant.

6. The power generating apparatus according to claim 5, further comprising:
a diffuser section disposed on a downstream side of the converging-diverging nozzle and having a membrane that separate products from the mixture.

7. The power generating apparatus according to claim 5, further comprising:
a pair of mirrors disposed on the diverging section of the nozzle and forming a resonance cavity that increases a path length of electromagnetic radiation in the diverging section.

8. The power generating apparatus according to claim 5, wherein the reaction is configured to generate electric discharge and activation of reactants by the electromagnetic radiation.

9. The power generating apparatus according to claim 1, further comprising:
a grid for converting the coherent electron beam into an alternating electron beam or a pulsed electron beam.

10. The power generating apparatus according to claim 1, further comprising:
a communication device for communicating the electromagnet radiation through an antenna.

11. A power generation system to generate energy from a renewable energy source, the system comprising:
an apparatus that generates a first current from a solar cell;
an emitter to convert the first current into a coherent electron beam, the emitter having a first single potential;
a collector having a second potential to accelerate electrons in the coherent electron beam, the collector provides a second current that is capable of driving a load, the collector comprises a secondary electron emissive surface to generate secondary electron emission; and
a converter that converts the second current to a power source capable of driving a load; and
an electromagnetic radiation device that generates electromagnetic radiation at a frequency substantially equal to an absorption frequency of a predetermined chemical reactant to generate hydrogen from water vapor.

12. The power generating apparatus according to claim 11, further comprising:
a reaction chamber configured to generate a standing wave of the electromagnetic radiation at the frequency substantially equal to the absorption frequency and additional standing waves of the electromagnetic radiation at one or more harmonic frequencies of the standing wave.

13. The power generating apparatus according to claim 12, further comprising:
   a pair of mirrors forming a resonance cavity that increases a path length of the electromagnetic radiation in the reaction chamber.

14. The power generating apparatus according to claim 13, wherein the mirrors are concave mirrors that focus the electromagnetic radiation into a region inside the reaction chamber, further comprising:
   a membrane transparent to the electromagnetic radiation and disposed in the region, the membrane separates reactants from products.

15. The power generating apparatus according to claim 12, further comprising:
   a converging-diverging nozzle for receiving a mixture that includes excited reactants from the reaction chamber and freezing the excited reactant.

16. The power generating apparatus according to claim 15, further comprising:
   a diffuser section disposed on a downstream side of the converging-diverging nozzle and having a membrane that separate products from the mixture.

17. The power generating apparatus according to claim 15, further comprising:
   a pair of mirrors disposed on the diverging section of the nozzle and forming a resonance cavity that increases a path length of electromagnetic radiation in the diverging section.

18. The power generating apparatus according to claim 15, wherein the reaction is configured to generate electric discharge and activation of reactants by the electromagnetic radiation.

19. The power generating apparatus according to claim 11, further comprising:
   a grid for converting the coherent electron beam into an alternating electron beam or a pulsed electron beam.

20. The power generating apparatus according to claim 11, further comprising:
   a communication device for communicating the electromagnet radiation through an antenna.

* * * * *